(12) United States Patent
Xu et al.

(10) Patent No.: US 12,213,116 B2
(45) Date of Patent: Jan. 28, 2025

(54) SPECIAL CELL DORMANT BANDWIDTH PART SWITCHING

(71) Applicant: Apple Inc., Cupertino, CA (US)

(72) Inventors: Fangli Xu, Beijing (CN); Dawei Zhang, Saratoga, CA (US); Haijing Hu, Los Gatos, CA (US); Naveen Kumar R. Palle Venkata, San Diego, CA (US); Sarma V. Vangala, Campbell, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 351 days.

(21) Appl. No.: 17/593,467

(22) PCT Filed: Aug. 6, 2020

(86) PCT No.: PCT/CN2020/107407
§ 371 (c)(1),
(2) Date: Sep. 19, 2021

(87) PCT Pub. No.: WO2022/027437
PCT Pub. Date: Feb. 10, 2022

(65) Prior Publication Data
US 2022/0046646 A1    Feb. 10, 2022

(51) Int. Cl.
*H04W 72/0453*    (2023.01)
*H04W 72/23*    (2023.01)
*H04W 74/00*    (2009.01)

(52) U.S. Cl.
CPC ....... *H04W 72/0453* (2013.01); *H04W 72/23* (2023.01); *H04W 74/004* (2013.01)

(58) Field of Classification Search
CPC ............. H04W 72/0453; H04W 72/23; H04W 74/004; H04W 72/20; H04W 76/15;
(Continued)

(56) References Cited

U.S. PATENT DOCUMENTS 11,800,563 B2 * 10/2023 Murray ............... H04W 74/002
2019/0124558 A1    4/2019 Ang et al.
(Continued)

FOREIGN PATENT DOCUMENTS

CN    110913422    3/2020
CN    111092709    5/2020
(Continued)

OTHER PUBLICATIONS

ZTE Corporation et al., "On transition from dormancy behavior"; 3GPP TSG-RAN WG2 Meeting #109 electronic; R2-2001264; Mar. 6, 2020; 2 sheets.

(Continued)

*Primary Examiner* — Kan Yuen
(74) *Attorney, Agent, or Firm* — Fay Kaplun & Marcin, LLP

(57) ABSTRACT

A user equipment (UE) may operate on a dormant bandwidth part (BWP) and a non-dormant BWP of a carrier. The UE identifies a dormant bandwidth part (BWP) and a non-dormant BWP of a carrier corresponding to a primary secondary cell (PSCell) of a secondary cell group (SCG) for dual connectivity (DC), receives an indication that an active BWP is to be switched from the non-dormant BWP to the dormant BWP and performs an action corresponding to the dormant BWP.

18 Claims, 17 Drawing Sheets

(58) Field of Classification Search
CPC ... H04L 5/0048; H04L 5/0055; H04L 5/0057; H04L 5/001; H04L 5/0092; Y02D 30/70
See application file for complete search history.

(56) References Cited

U.S. PATENT DOCUMENTS

| | | | |
|---|---|---|---|
| 2020/0029316 A1 | 1/2020 | Zhou et al. | |
| 2020/0037248 A1 | 1/2020 | Zhou et al. | |
| 2020/0145164 A1 | 5/2020 | Cheng | |
| 2020/0245249 A1 | 7/2020 | Medles et al. | |
| 2020/0304277 A1 | 9/2020 | Shi | |
| 2020/0351069 A1 | 11/2020 | Grant et al. | |
| 2020/0396044 A1* | 12/2020 | Lee | H04L 47/765 |
| 2021/0226684 A1 | 7/2021 | Koskela et al. | |
| 2021/0250920 A1 | 8/2021 | Kim et al. | |
| 2021/0298029 A1* | 9/2021 | Liu | H04W 72/0453 |
| 2021/0329677 A1 | 10/2021 | Huang | |
| 2022/0007256 A1* | 1/2022 | Ozturk | H04W 36/0077 |
| 2022/0007446 A1* | 1/2022 | Purkayastha | G06F 1/3209 |
| 2022/0022067 A1* | 1/2022 | Kim | H04L 5/0094 |
| 2022/0030659 A1 | 1/2022 | Kim | |
| 2022/0046522 A1* | 2/2022 | Kim | H04W 76/15 |
| 2022/0167358 A1* | 5/2022 | Cheng | H04W 72/542 |
| 2022/0248325 A1* | 8/2022 | Wang | H04L 5/0035 |
| 2022/0264686 A1* | 8/2022 | Tsai | H04W 76/20 |
| 2022/0312519 A1 | 9/2022 | Xu et al. | |
| 2022/0330155 A1* | 10/2022 | Cheng | H04W 52/0235 |
| 2022/0394583 A1* | 12/2022 | Deenoo | H04W 74/0841 |
| 2023/0034859 A1* | 2/2023 | Wu | H04W 72/0446 |
| 2023/0171838 A1* | 6/2023 | Zhang | H04W 52/0229 370/329 |
| 2023/0199881 A1* | 6/2023 | Freda | H04L 5/0055 370/329 |
| 2023/0345579 A1* | 10/2023 | Teyeb | H04W 76/19 |
| 2023/0362896 A1 | 11/2023 | Wu et al. | |

FOREIGN PATENT DOCUMENTS

| | | |
|---|---|---|
| CN | 111093277 | 5/2020 |
| CN | 111148052 | 5/2020 |
| CN | 111264042 | 6/2020 |
| CN | 111277399 | 6/2020 |
| WO | 2020/143479 | 7/2020 |
| WO | 2020/146796 | 7/2020 |

OTHER PUBLICATIONS

ZTE Corporation et al., "On SCG Suspension", 3GPP TSG-RAN WG2 Meeting #107bis; R2-1913491, Sep. 18, 2019, 8 sheets.

Vivo, "UE behaviour for a suspended SCG", 3GPP TSG-RAN WG2 Meeting #108; R2-1914944, Nov. 22, 2019, 5 sheets.

* cited by examiner

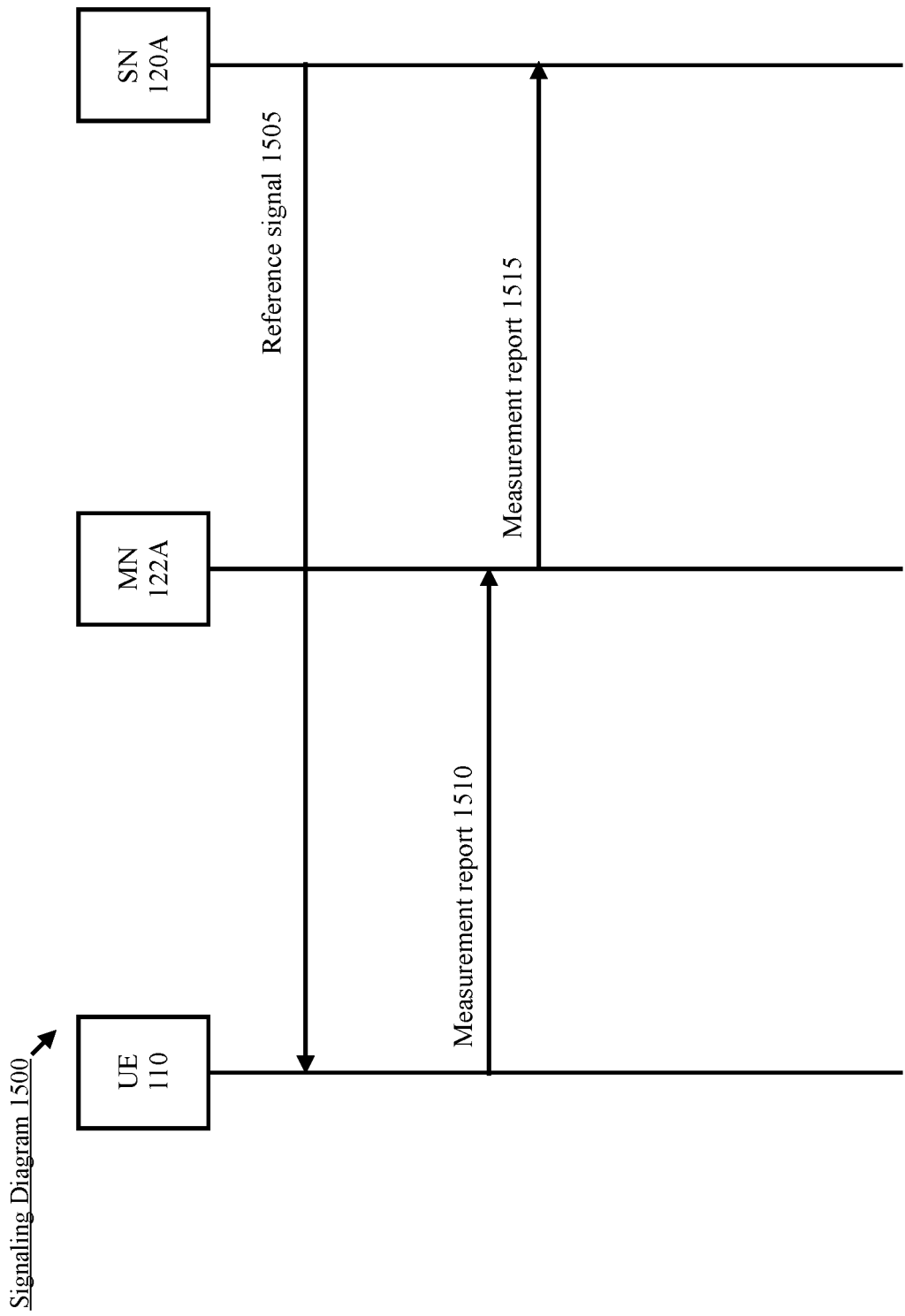

SPECIAL CELL DORMANT BANDWIDTH PART SWITCHING

BACKGROUND

A Fifth Generation (5G) New Radio (NR) cell may be capable of utilizing multiple bandwidth parts (BWPs). For example, the cell may be configured with a non-dormant BWP and a dormant BWP. Generally, the non-dormant BWP may be used to provide access to network services normally available via the network connection and the dormant BWP may be used to provide power saving benefits to a connected user equipment (UE). In a dual-connectivity (DC) scenario, a dormant BWP may be implemented by a special cell (SpCell) to provide power and performance benefits for a connected UE

SUMMARY

Some exemplary embodiments are related to a user equipment (UE) having a processor and a transceiver communicatively connected to the processor. The processor is configured to perform operations. The operations include identifying a dormant bandwidth part (BWP) and a non-dormant BWP of a carrier corresponding to a primary secondary cell (PSCell) of a secondary cell group (SCG) for dual connectivity (DC), receiving an indication that an active BWP is to be switched from the non-dormant BWP to the dormant BWP and performing an action corresponding to the dormant BWP.

Other exemplary embodiments are related to a baseband processor configured to perform operations. The operations include identifying a dormant bandwidth part (BWP) and a non-dormant BWP of a carrier corresponding to a primary secondary cell (PSCell) of a secondary cell group (SCG) for dual connectivity (DC), receiving an indication that an active BWP is to be switched from the non-dormant BWP to the dormant BWP and performing an action corresponding to the dormant BWP.

Still other exemplary embodiments are related to a method performed by a user equipment (UE). The method includes identifying a dormant bandwidth part (BWP) and a non-dormant BWP of a carrier corresponding to a primary secondary cell (PSCell) of a secondary cell group (SCG) for dual connectivity (DC), receiving an indication that an active BWP is to be switched from the non-dormant BWP to the dormant BWP and performing an action corresponding to the dormant BWP.

BRIEF DESCRIPTION OF THE DRAWINGS

FIG. 15 shows a signaling diagram for exchanging SCG associated information via the MN according to various exemplary embodiments.

DETAILED DESCRIPTION

Figure 1:
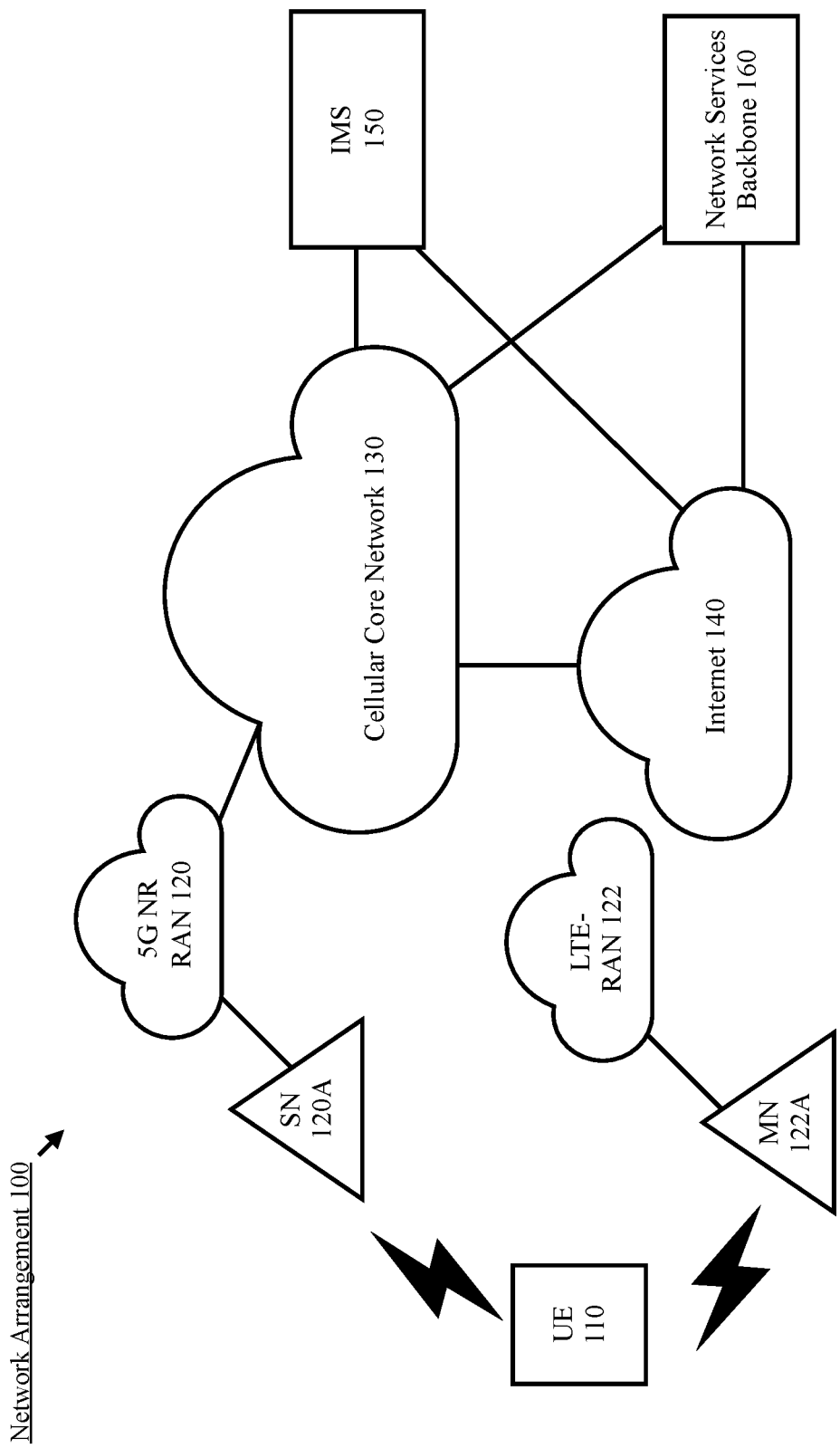
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to implementing a dormant bandwidth part (BWP) for a special cell (SpCell). As will be described in more detail below, the exemplary embodiments may provide power and performance benefits for a user equipment (UE) configured with dual-connectivity (DC).

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

The UE may support DC to a master cell group (MCG) and a secondary cell group (SCG). The MCG may include at least a master node (MN) and the SCG may include at least a secondary node (SN). In addition, the exemplary embodiments are described with regard to a special cell (SpCell). The term "SpCell" may refer to a primary cell (PCell) of the MCG or a primary secondary cell (PSCell) of the SCG. Thus, the terms "SpCell," "MN" and "PCell" may be used interchangeably within the context of DC. Further, the terms "SpCell," "SN" and "PSCell" may also be used interchangeably within the context of DC.

A 5G carrier may be configured with multiple BWPs. Those skilled in the art will understand that a BWP may refer to a set of physical resource blocks (PRBs) within the carrier. As will be described in more detail below, a carrier may include at least one dormant BWP and at least one non-dormant BWP. However, the configuration and arrangement of BWPs within a carrier may change from carrier to carrier. Thus, any reference to a particular configuration or arrangement of BWPs within a carrier is merely provided for illustrative purposes.

The non-dormant BWP may be used for access to network services normally available via the network connection. For example, the UE may transmit and/or receive data on the non-dormant BWP. The dormant BWP may be used to provide power saving benefits with regard to data exchange processing at the UE. Specific examples of network and UE behavior with regard to the dormant BWP will be discussed in detail below.

A BWP may transition between an activated state and a deactivated state. The UE may perform one or more operations related to data exchange processing for a BWP that is in the activated state and the UE may not perform any operations related to data exchange processing for a BWP in the deactivated state. For example, at a first time, the non-dormant BWP may be activated to enable the exchange of data between the UE and the network. At a second time, the non-dormant BWP may be deactivated, and the dormant BWP may be activated. From the perspective of the UE, there is less information and/or data to monitor for when the non-dormant BWP is in the activated state. This provides power saving benefits to the UE. At a third time, the active BWP may be switched back to the non-dormant BWP to once again enable the exchange of data between the UE and the network.

The exemplary embodiments relate to implementing a dormant BWP for a SpCell. In a first aspect, the exemplary embodiments include mechanisms for the UE and the network to handle situations related to BWP switching between the non-dormant BWP and the dormant BWP. In a second aspect, the exemplary embodiments relate to UE operation associated with a SpCell when the dormant BWP is activated. In a third aspect, the exemplary embodiments relate to UE operation associated with a SCG when the dormant BWP is activated. The examples provided throughout this description are described with regard to a SpCell that is a PSCell. However, those skilled in the art will understand that the exemplary concepts described herein may be applicable to an SpCell that is a PCell that supports multiple BWPs.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120 and an LTE radio access network (LTE-RAN) 122. However, it should be understood that the UE 110 may also communicate with other types of networks (e.g. 5G cloud RAN, NR in the unlicensed (NR-U), a next-generations radio access network (NG-RAN), legacy cellular network, WLAN, etc.) and the UE 110 may also communicate with networks over a wired connection. With regard to the exemplary embodiments, the UE 110 may establish a connection with the 5G NR-RAN 120 and/or the LTE-RAN 122. Therefore, the UE 110 may have both a 5G NR chipset to communication with the 5G NR-RAN 120 and an LTE chipset to communicate with the LTE-RAN 122.

The 5G NR-RAN 120 and the LTE-RAN 122 may be portions of cellular networks that may be deployed by cellular providers (e.g., Verizon, AT&T, Sprint, T-Mobile, etc.). These networks 120 and 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The exemplary embodiments are described with regard to a scenario in which the UE 110 is already configured with DC. Generally, DC includes the UE 110 simultaneously connected to an MCG and a SCG. In the network arrangement 100, the 5G NR RAN 120 includes a SN 120A that represents a gNB. The SN 120A may be configured as a PSCell of a SCG. Thus, reference to a single cell corresponding to the 5G NR RAN 120 is merely provided for illustrative purposes. In an actual operating scenario, there may be multiple cells included in a SCG that is configured to serve the UE 110. Further, the LTE-RAN 122 includes a MN 122A that represents an eNB. The MN 122A may be configured as a PCell of an MCG. Thus, reference to a single cell corresponding to the LTE-RAN 122 is merely provided for illustrative purposes. In an actual operating scenario, there may be multiple cells included in an MCG that is configured to serve the UE 110.

A cell (e.g., MN 122A, SN 120A) may include one or more communication interfaces to exchange data and/or information with UEs, a RAN, the cellular core network 130, other cells, the internet 140, etc. Further, a cell may include a processor configured to perform various operations. For example, the processor of the cell may be configured to perform operations related to DC, BWP activation/deactivation, BWP switching, etc. However, reference to a processor is merely for illustrative purposes. The operations of the cell may also be represented as a separate incorporated component of the cell or may be a modular component coupled to the cell, e.g., an integrated circuit with or without firmware. For example, the integrated circuit may include input circuitry to receive signals and processing circuitry to process the signals and other information. In addition, in some examples, the functionality of the processor is split among two or more processors such as a baseband processor and an applications processor. The exemplary embodiments may be implemented in any of these or other configurations of a cell.

Those skilled in the art will understand that any association procedure may be performed for the UE 110 to connect to the 5G NR-RAN 120 and/or the LTE-RAN 122. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell. For access to LTE services, a similar association procedure may be performed with the LTE RAN 122. However, as mentioned above, reference to the 5G NR-RAN 120 and the LTE-RAN 122 is merely for illustrative purposes and any appropriate type of RAN may be used.

To provide an example of DC within the context of the network arrangement 100, the UE 110 may be connected to both the 5G NR-RAN 120 and the LTE-RAN 122. However, reference to an independent 5G NR-RAN 120 and an independent LTE-RAN 122 is merely provided for illustrative purposes. An actual network arrangement may include a RAN that includes architecture that is capable of providing both 5G NR RAT and LTE RAT services. For example, a next-generations radio access network (NG-RAN) (not pictured) may include a next generation Node B (gNB) that provides 5G NR services and a next generation evolved Node B (ng-eNB) that provides LTE services. The NG-RAN may be connected to at least one of the evolved packet core (EPC) or the 5G core (5GC). Thus, in one exemplary configuration, the UE 110 may achieve DC by establishing a connection to at least one cell corresponding to the 5G NR-RAN 120 and at least one cell corresponding to the LTE-RAN 122. In another exemplary configuration, the UE 110 may achieve DC by establishing a connection to at least two cells corresponding to the NG-RAN or any other type of similar RAN that supports DC. To provide another example of DC, the UE 110 may connect to one or more RANs that provide 5G NR services. For example, a NG-RAN may support multiple nodes that each provide 5G new radio (NR) access, e.g., NR-NR DC. Similarly, the UE 110 may connect to a first RAN that provides 5G NR services and a second different RAN that also provides 5G NR services. Accordingly, the example of a single independent 5G NR-RAN 120 and a single independent LTE-RAN 122 is merely provided for illustrative purposes.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation/traffic of the cellular network and may include the EPC and/or the 5GC. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
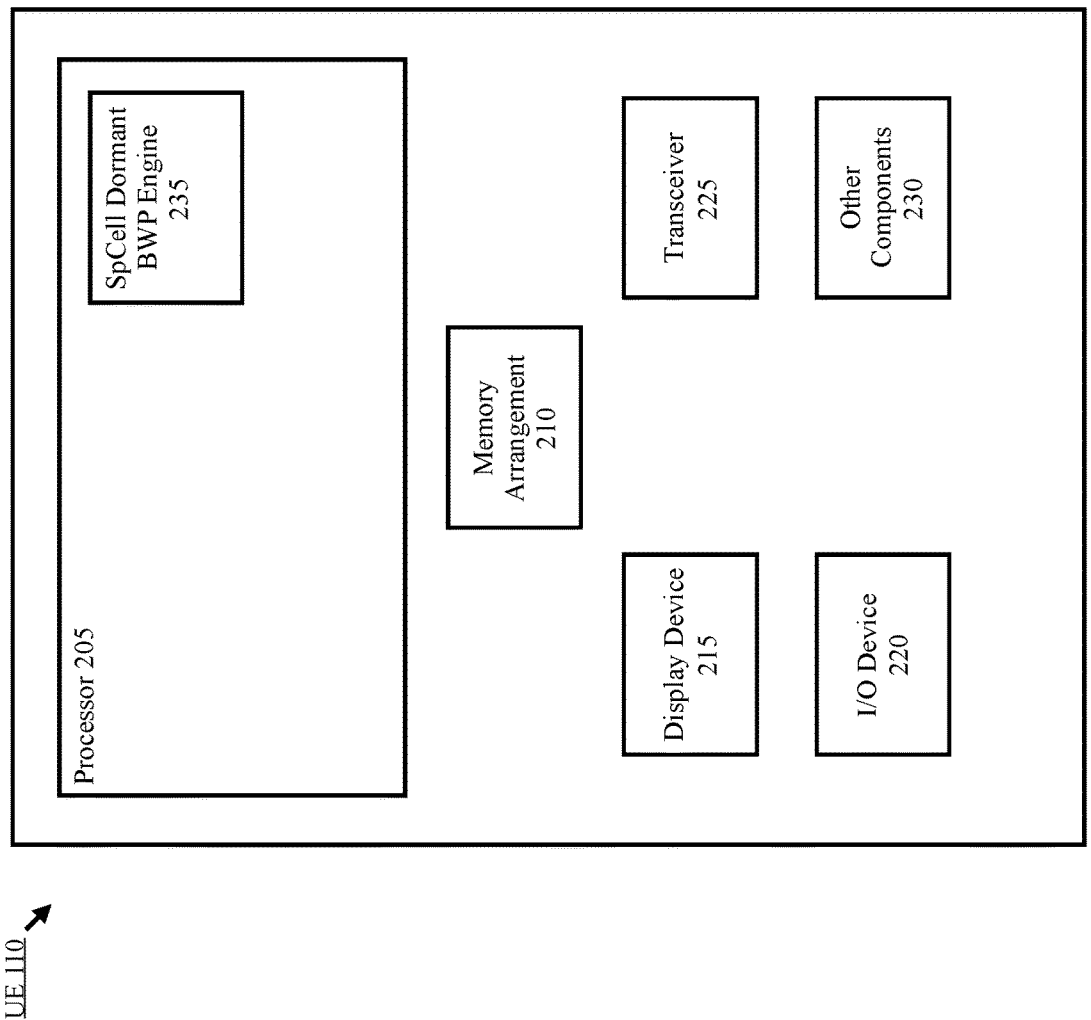
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a SpCell dormant BWP engine 235. The SpCell dormant BWP engine 235 may be configured to perform operations related to BWP activation, BWP deactivation, BWP switching, monitoring a dormant BWP and exchanging information associated the SCG when the dormant BWP is activated for a PSCell of the SCG (e.g., SN 120A).

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, a legacy RAN (not pictured), a WLAN (not pictured), etc. Accordingly, the transceiver 225 may operate on a variety of different frequencies or channels (e.g., set of consecutive frequencies).

Figure 3:
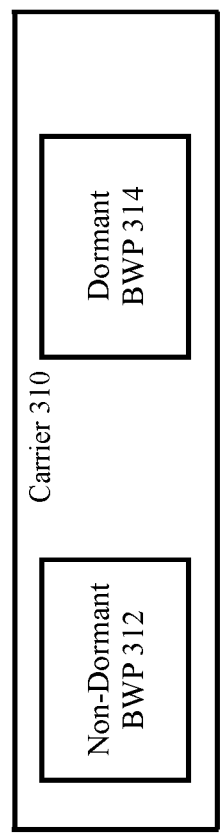
FIG. 3 illustrates an example of a carrier that includes multiple bandwidth parts (BWPs).

FIG. 3 illustrates an example of a carrier 310 that includes multiple BWPs. The carrier 310 may be used for uplink and/or downlink communications between the UE 110 and the SN 120A. In this example, the carrier 310 includes a non-dormant BWP 312 that represents a first set of PRBs and a dormant BWP 314 that represents a second set of PRBs. The arrangement and configurations of BWPs within a carrier may vary from carrier to carrier. Thus, the example illustrated in FIG. 3 is just one possible configuration of BWPs and is not intended to limit the exemplary embodiments in any way. The exemplary embodiments are applicable to a dormant BWP and a non-dormant BWP being arranged within the carrier 310 in any appropriate manner.

A BWP may transition between an activated state and a deactivated state. When in the activated state, a BWP may be used for uplink and/or downlink communications. For example, the UE 110 may receive physical downlink control channel (PDCCH) information dedicated to the UE 110, PDCCH information in the common search space and/or physical downlink shared channel (PDSCH) data from the SN 120A on the BWP configured in the activated state. The UE 110 may also transmit control information and/or data to the SN 120A on the BWP configured in the activated state.

To provide an example within the context of FIG. 3, when the non-dormant BWP 312 is configured in the activated state, the UE 110 may exchange information and/or data with the SN 120A on the non-dormant BWP 312. When the non-dormant BWP 314 is configured in the deactivated state, the network may not assign resources to the UE 110 on the non-dormant BWP 312.

The UE 110 may receive power saving benefits with regard to data exchange processing when the dormant BWP 314 is configured in the activated state. Compared to the non-dormant BWP 312, the dormant BWP 314 is not used for as many types of data and/or information. Thus, there is less monitoring performed by the UE 110 when the dormant BWP 314 is configured in the activated state. For example, the SN 120A may transmit reference signals to the UE 110 on the dormant BWP 314 to ensure that the UE 110 remains synchronized with the SN 120A. However, when data is to be exchanged between the UE 110 and the SN 120A, the UE 110 or the network may trigger a switch of the activated BWP from the dormant BWP 314 to the non-dormant BWP 312. Specific examples of network and UE 110 behavior when the dormant BWP 314 is in the activated state will be described in more detail below.

Figure 4:
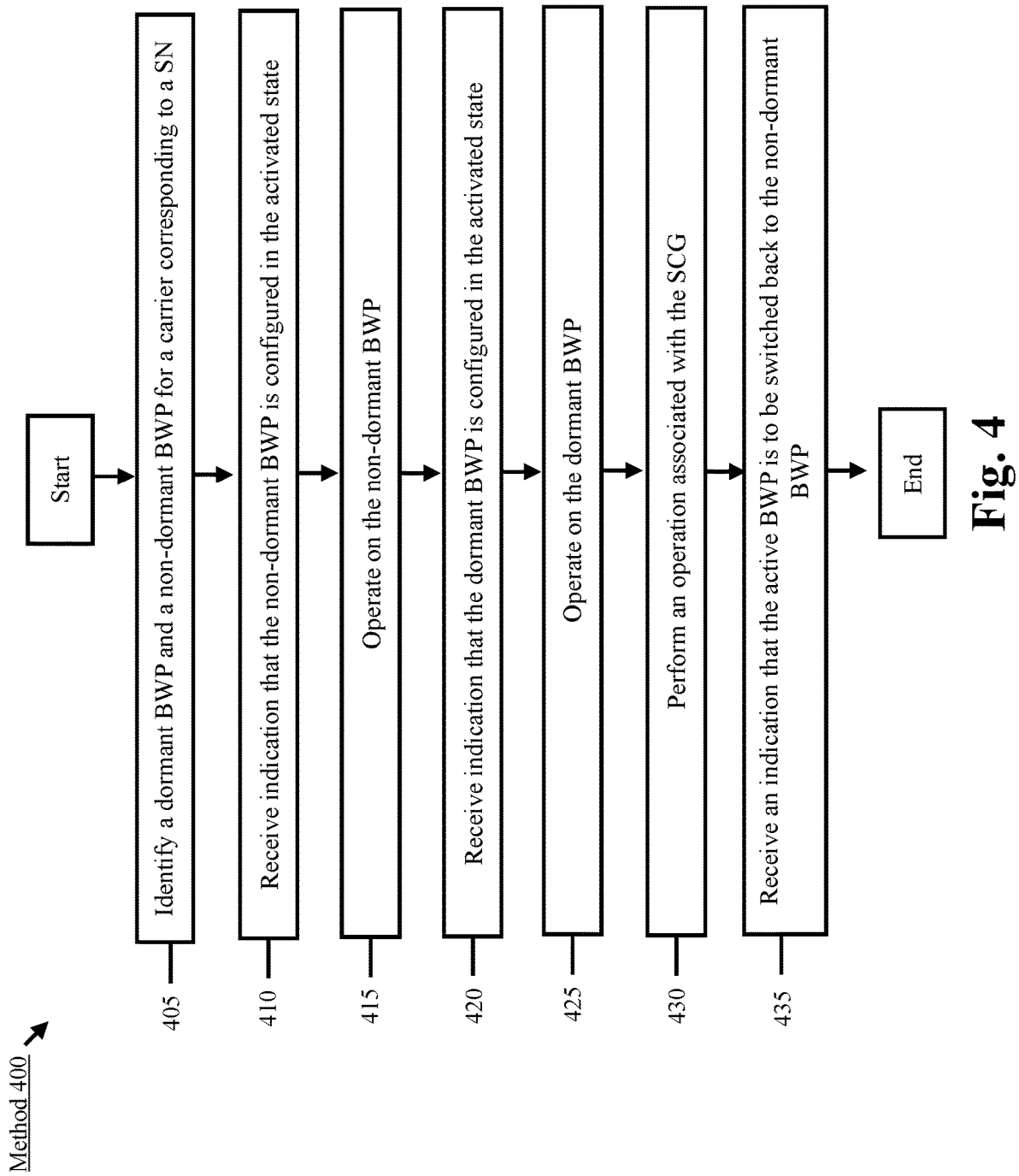
FIG. 4 shows a method for dormant BWP and non-dormant BWP switching from the perspective of the UE according to various exemplary embodiments.

FIG. 4 shows a method 400 for dormant BWP and non-dormant BWP switching from the perspective of the UE 110 according to various exemplary embodiments. The method 400 will be described with regard to the network arrangement 100 of FIG. 1, the UE 110 of FIG. 2 and the carrier 310 of FIG. 3.

Initially, consider a scenario in which the UE 110 is connected to the MN 122A of the LTE-RAN 122. To provide the UE 110 with 5G NR services, the UE 110 may be configured with DC. Accordingly, the UE 110 may establish a connection to the SN 120A of the 5G NR RAN 120.

In 405, the UE 110 identifies a non-dormant BWP and a dormant BWP for a carrier corresponding to the SN 120A. For example, the UE 110 may receive information that indicates that the SN 120A supports the carrier 310 that includes non-dormant BWP 312 and dormant BWP 314. The UE 110 may receive this information from the network before, during or after the establishment of DC. In some embodiments, this information may be received during a radio resource control (RRC) signaling exchange between the UE 110 and either the MN 122A or between the UE 110 and the SN 120A. In other embodiments, this information may be broadcast by the SN 120 in a system information block (SIB) or any other similar type of mechanism.

In 410, the UE 110 receives an indication that the non-dormant BWP 312 is configured in the activated state. As will be described in more detail below, this indication may be received from the MN 122A, the SN 120A and/or a process being executed locally at the UE 110.

In 415, the UE 110 operates on the non-dormant BWP 312. For example, the UE 110 may tune its transceiver 225 to the non-dormant BWP 312. The non-dormant BWP 312 may be used to transport a variety of different types of information and/or data. For example, when the non-dormant BWP 312 is in the activated state, the UE 110 may receive PDCCH information dedicated for the UE 110, PDCCH information in the common search space, PDSCH data and/or reference signals from the SN 120A on the non-dormant BWP 312. These types of communications may be associated with mechanisms such as, but not limited to, PDCCH monitoring, sounding reference signal (SRS) transmission and reception, PUSCH transmissions, PDSCH reception, a random access channel (RACH procedure, channel state information (CSI) measurement and reporting, automatic gain control (AGC), beam management, etc.

As indicated above, the non-dormant BWP 312 may be used for a wide variety of different types of communications and be associated with a wide variety of different types of procedures. Accordingly, the UE 110 may expend a significant amount of power when the non-dormant BWP 312 is configured in the activated state even when there is no data being transmitted or received on the non-dormant BWP 312. To provide power saving benefits to the UE 110 and to ensure that the SN 120A remains in the activated state, BWP switching may be implemented.

In 420, the UE 110 receives an indication that the dormant BWP 314 is configured in the activated state. In some embodiments, this indication may be received via the SCG link or via the MCG link. Specific examples of this type of signaling will be described in more detail below with regard to FIGS. 5-7c. In other embodiments, this indication may be received from a process running locally at the UE 110. Specific examples of these types of mechanisms will be described in more detail below with regard to FIGS. 8-9.

In 425, the UE 110 operates the dormant BWP 314. Generally, the dormant BWP 314 is utilized to provide the UE 110 with power saving benefits while also ensuring fast SN 120A activation. The operations supported by the UE 110 and/or the network when the dormant BWP 314 is configured in the activated state may be preconfigured or indicated to the UE 110 by the network via RRC signaling or in any other appropriate manner.

To provide an example, when the dormant BWP 314 is configured in the activated state, the reception and transmission of dedicated data (e.g., PDSCH, PUSCH) and dedicated PDCCH may not be supported on the dormant BWP 314. This may provide a power saving benefit to the UE 110 with regard to data exchange processing because the UE 110 does not have to monitor or process these types of data and/or information. However, the UE 110 may still monitor the common search space for an indication to switch the active BWP back to the non-dormant BWP 312.

To provide further examples, in some embodiments, a RACH procedure may not be supported when the dormant BWP 314 is in the activated state. In other embodiments, a RACH procedure may be supported when the dormant BWP 314 is in the activated state. In some embodiments, radio resource management (RRM) measurements, radio link monitoring (RLM) measurements, channel state information (CSI) measurements and/or beam management procedures (e.g., beam failure detection (BFD), beam failure recovery (BFR), etc.) may not be supported when the dormant BWP 314 is in the activated state. In other embodiments, RRM measurements, RLM measurements, CSI measurements and/or beam management procedures may be supported when the dormant BWP 314 is in the activated state. In some embodiments, SRS transmission may not be supported when the dormant BWP 314 is in the activated state. In other embodiments, SRS transmission may be supported may be supported when the dormant BWP 314 is in the activated state.

In 430, the UE 110 performs an operation associated with the SCG. For example, when the dormant BWP 314 is configured in the activated state, the SCells of the SCG may be configured in the deactivated state or may also be configured with a dormant BWP in the activated state. In this type of scenario, the exchange of data and/or information associated with the SCG between the UE 110 and the SN 120A may be facilitated by the MN 122A. Thus, performing an operation associated with the SCG may include transmitting a signal to the SN 120A via the MCG link. Specific examples of the types of operations that may be performed with regard to the SCG when the dormant BWP 314 is configured in the activated state will be described in more detail below with regard to FIGS. 10-15.

As indicated above, when the SN 120A is configured with a dormant BWP 314 in the activated state, the SCells of the SCG may be placed in the deactivated state. Throughout this description, the term "SCG dormant state" may refer to a scenario in which the dormant BWP 314 is configured in the activated state and the SCells of the SCG are configured in the deactivated state. The term "SCG non-dormant state" may refer to a scenario in which the non-dormant BWP 312 is configured in the activated state and the SCells of the SCG are also configured in the activated state.

In 435, the UE 110 receives an indication that the active BWP is to be switched back to the non-dormant BWP 312. This indication may be a signal received from the MN 122A, the SN 120A and/or a process being executed locally at the UE 110 (e.g., a timer, identifying a predetermined condition, etc.).

The method 400 provides a general overview of dormant BWP and non-dormant BWP switching from the perspective of the UE 110. As mentioned above, specific examples of the signaling exchanges that may be used to trigger dormant BWP and non-dormant BWP switching will be described in more detail below with regard to FIGS. 5-9. Further, specific examples of the signaling exchanges that may be used to exchange SCG associated information when the dormant BWP 314 is configured in the activated state will be described in more detail below with regard to FIGS. 10-15.

Figure 5:
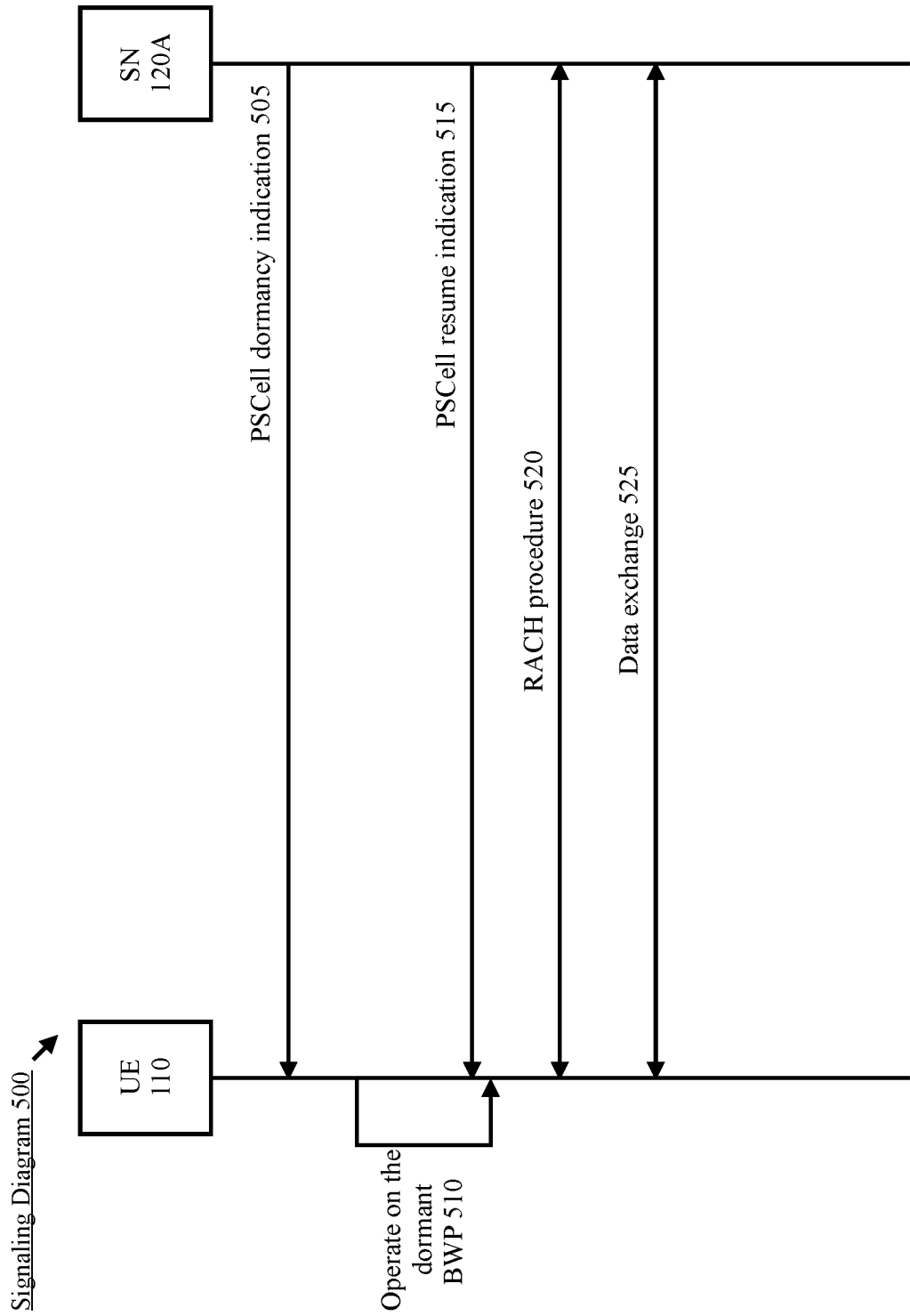
FIG. 5 shows a signaling diagram for non-dormant BWP and dormant BWP switching via a secondary cell group (SCG) link according to various exemplary embodiments.

FIG. 5 shows a signaling diagram 500 for non-dormant BWP and dormant BWP switching via a SCG link according to various exemplary embodiments. The signaling diagram 500 includes the UE 110 and the SN 120A.

Initially, consider a scenario in which DC is established and the non-dormant BWP 312 is currently configured in the activated state. Further, the UE 110 is configured to switch to the non-dormant BWP 312 when the UE 110 is triggered to switch out from the dormant BWP 314.

In 505, the UE 110 receives a signal from the SN 120A via the SCG link. For example, the signal may be a PSCell dormancy indication that indicates the active BWP for the SN 120A is to be switched to the dormant BWP 314. The signal may be a layer 1 (L1) command transmitted in the common search space associated with the SN 120A. The monitoring search space and control resource set (CORSET) of the dormant BWP 314 may be configured with a longer interval compared to the non-dormant BWP 312 to provide power saving benefits to the UE 110.

To facilitate this type of signaling, a radio network temporary identifier (RNTI) for non-dormant BWP and dormant BWP switching may be implemented or an RNTI intended for a different purpose may be used. For example, the network may associate the UE 110 (or a group of UEs) with the RNTI. The network may then indicate to the UE 110 that the UE 110 is associated with the RNTI. In response, the UE 110 may monitor for DCI that includes an RNTI associated with the UE 110. The presence of the RNTI may indicate that the UE 110 is the intended recipient of the DCI. In some embodiments, DCI formant 2_6 may be utilized for the L1 command. Further, as indicated above, the RNTI may be associated with a group of UEs. Thus, the SN 120A may implement group based signaling for non-dormant BWP and dormant BWP switching of multiple UEs.

In 510, the UE 110 operates on the dormant BWP 314. As indicated above in the method 400, when the dormant BWP 314 is configured in the activated state the UE 110 may not transmit or receive dedicated data but the UE 110 may still monitor for common control information.

In 515, the UE 110 receives a signal from the SN 120A via the SCG link. The signal may be a PSCell resume indication configured to indicate that the active BWP for the SN 120A is to be switched out of the dormant BWP 314 to the non-dormant BWP 312. For example, the SN 120A may initiate the switch when there is data to be exchanged with the UE 110 in the uplink and/or downlink. Those skilled in the art will understand that this indication may be delivered to the UE 110 in a substantially manner to the indication delivered in 505.

In 520, a RACH procedure may be performed. Generally, the RACH procedure may be performed to ensure that the uplink to the SN 120A is not out of synchronization. In some embodiments, the UE 110 may only perform the RACH procedure when the UE 110 identifies or assumes that the uplink with the SN 120A is out of synchronization. Alternatively, any other appropriate type of mechanism may be utilized to ensure that the uplink is not out of synchronization.

In 525, a data exchange between the UE 110 and the SN 120A may occur. At this time, the non-dormant BWP 312 is configured in the activated state and thus, the UE 110 may transmit and/or receive dedicated UE data with the SN 120A.

Figure 6:
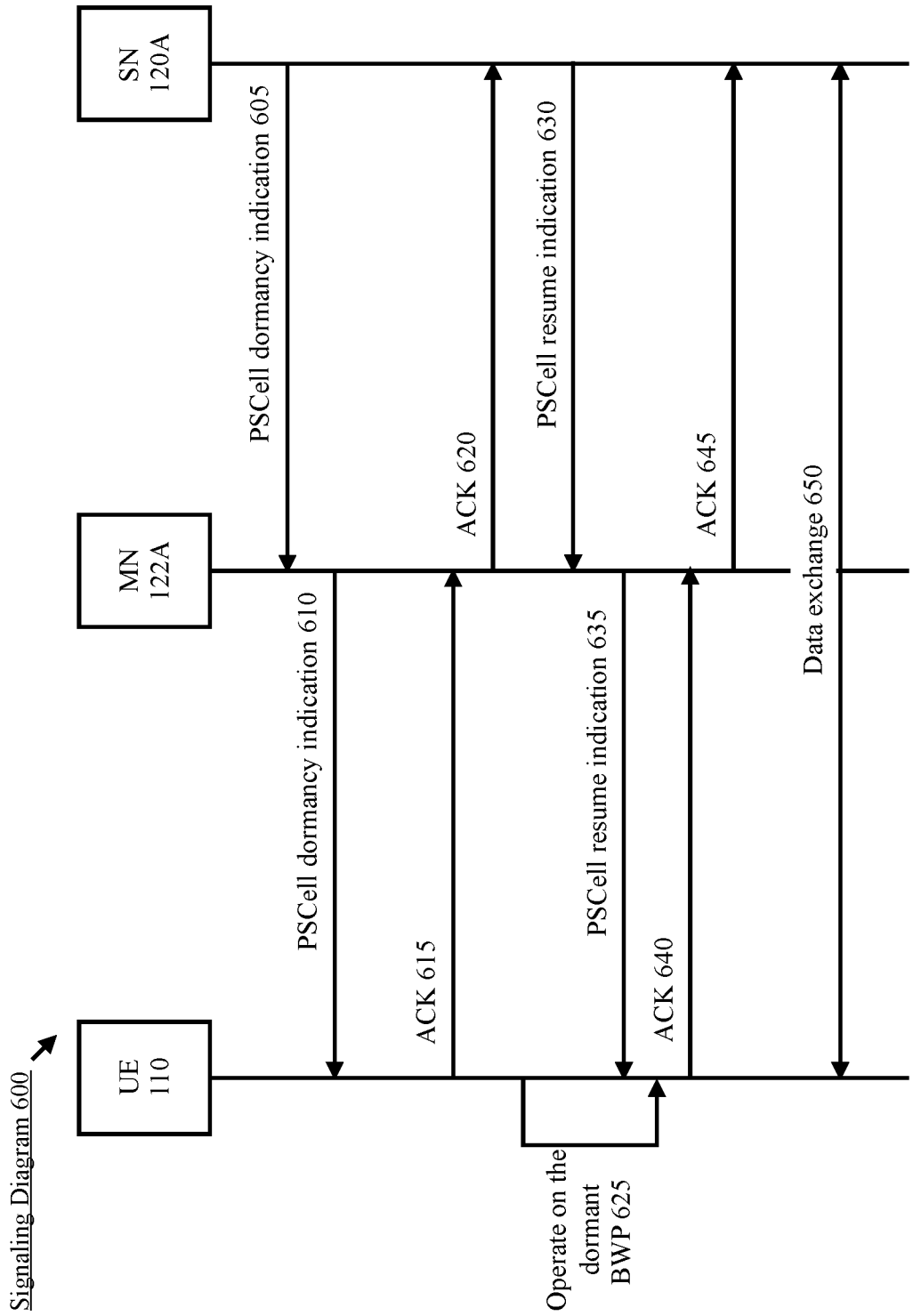
FIG. 6 shows a signaling diagram for non-dormant BWP and dormant BWP switching via a master cell group (MCG) link according to various exemplary embodiments.

FIG. 6 shows a signaling diagram 600 for non-dormant BWP and dormant BWP switching via an MCG link according to various exemplary embodiments. The signaling diagram 600 includes the UE 110, the MN 122A and the SN 120A.

Initially, consider a scenario in which DC is established and the non-dormant BWP 312 is currently configured in the activated state. Further, the UE 110 is configured to switch to the non-dormant BWP 312 when the UE 110 is triggered to switch out from the dormant BWP 314.

In 605, the SN 120A may transmit a PSCell dormancy indication to the MN 122A that indicates the active BWP for the SN 120A is to be switched to the dormant BWP 314. In 610, the MN 122A may transmit a PSCell dormancy indication to the UE 110 that indicates the active BWP for the SN 120A is to be switched to the dormant BWP 314. Thus, the MN 122A may transmit BWP switching information for the SN 120A to the UE 110 via the MCG link.

As will be described in more detail below with regard to FIG. 7, in some embodiments, the SN 120A may generate the indication and the MN 122A may include the indication in its container for transmission. In other embodiments, the SN 120A determines the dormancy state for the SN 120A and send an indication to the MN 122A. In response, the MN 120A may generate a message that is to be transmitted to the UE 110 that indicates that the active BWP for SN 120A is to be switched to the dormant BWP 312. In further, embodiments, the MN 122A may determine the SN 120A dormancy state and transmit an indication to both the SN 120A and the UE 110.

In 615, the UE 110 may transmit an acknowledgement (ACK) to the MN 122A in response to the PSCell dormancy indication. In 620, MN 122A may then transmit an indication of the ACK to the SN 120A.

In 625, the UE 110 operates on the dormant BWP 314. As mentioned above, operating on the dormant BWP 314 may include monitoring the common search space. However, in these types of scenarios where BWP switching on the SN 120A may be facilitated via the MN 122A, it may be unnecessary to monitor the common search space for the switching indication because it may be received via the MN 122A.

In 630, SN 120A may transmit a PSCell resume indication to the MN 122A that indicates the active BWP for the SN 120A is to be switched to the non-dormant BWP 314. In 635, the MN 122A may transmit a PSCell resume indication to the UE 110 that indicates the active BWP for the SN 120A is to be switched to the non-dormant BWP 312. In 640, the UE 110 may transmit an ACK to the MN 122A in response to the PSCell resume indication. In 645, the MN 122A may then transmit an indication of the ACK to the SN 120A. Alternatively, in some embodiments, the UE 110 may transmit the ACK directly to the SN 120A via the SCG link (not pictured).

In 650, a data exchange between the UE 110 and the SN 120A may occur. At this time, the non-dormant BWP 312 is configured in the activated state and thus, the UE 110 may transmit and/or receive dedicated UE data with the SN 120A.

Figure 7A:
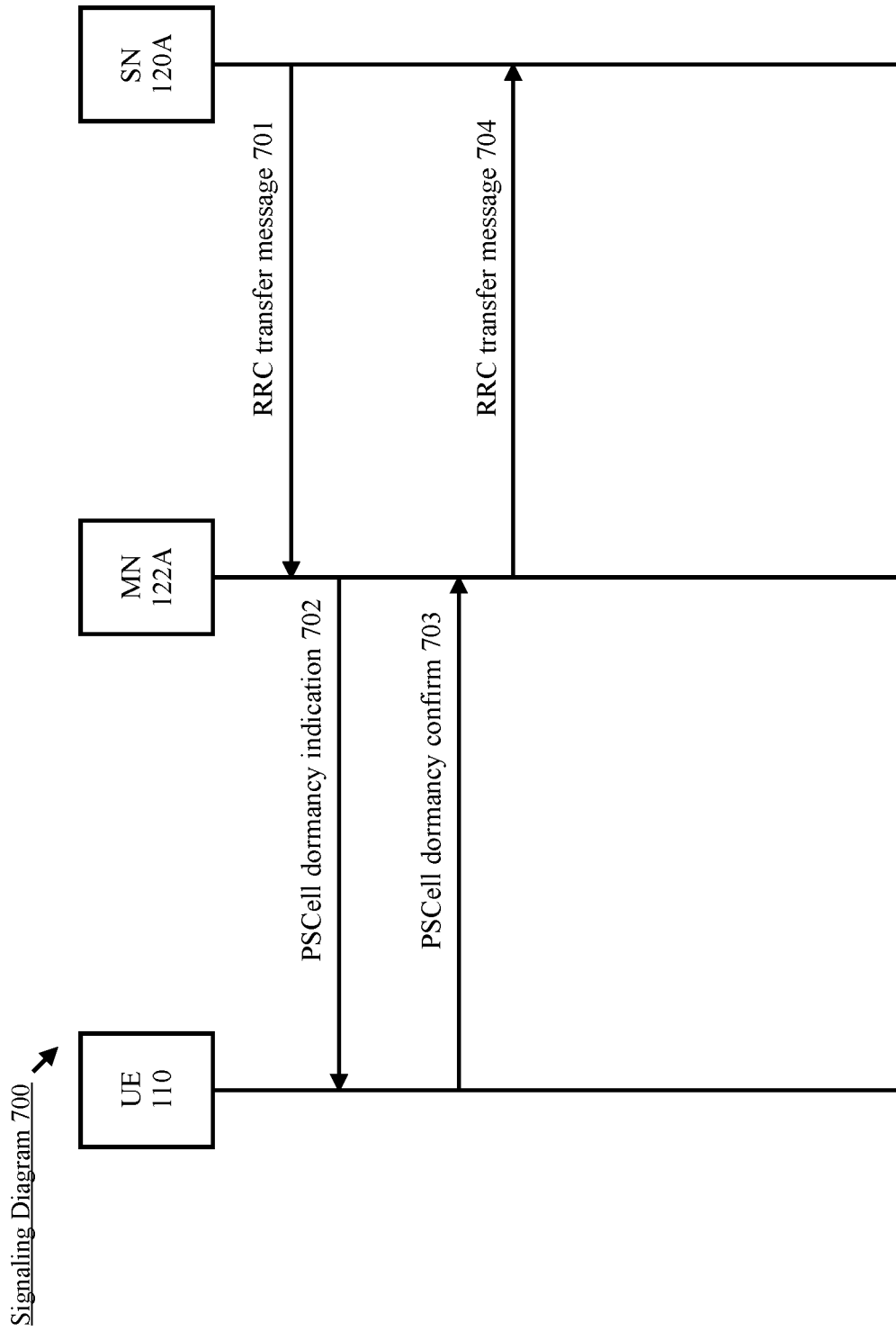
FIGS. 7a-7c shows signaling diagrams for providing a primary secondary cell (PSCell) dormancy indication via an MCG link according to various exemplary embodiments.
Figure 7B:
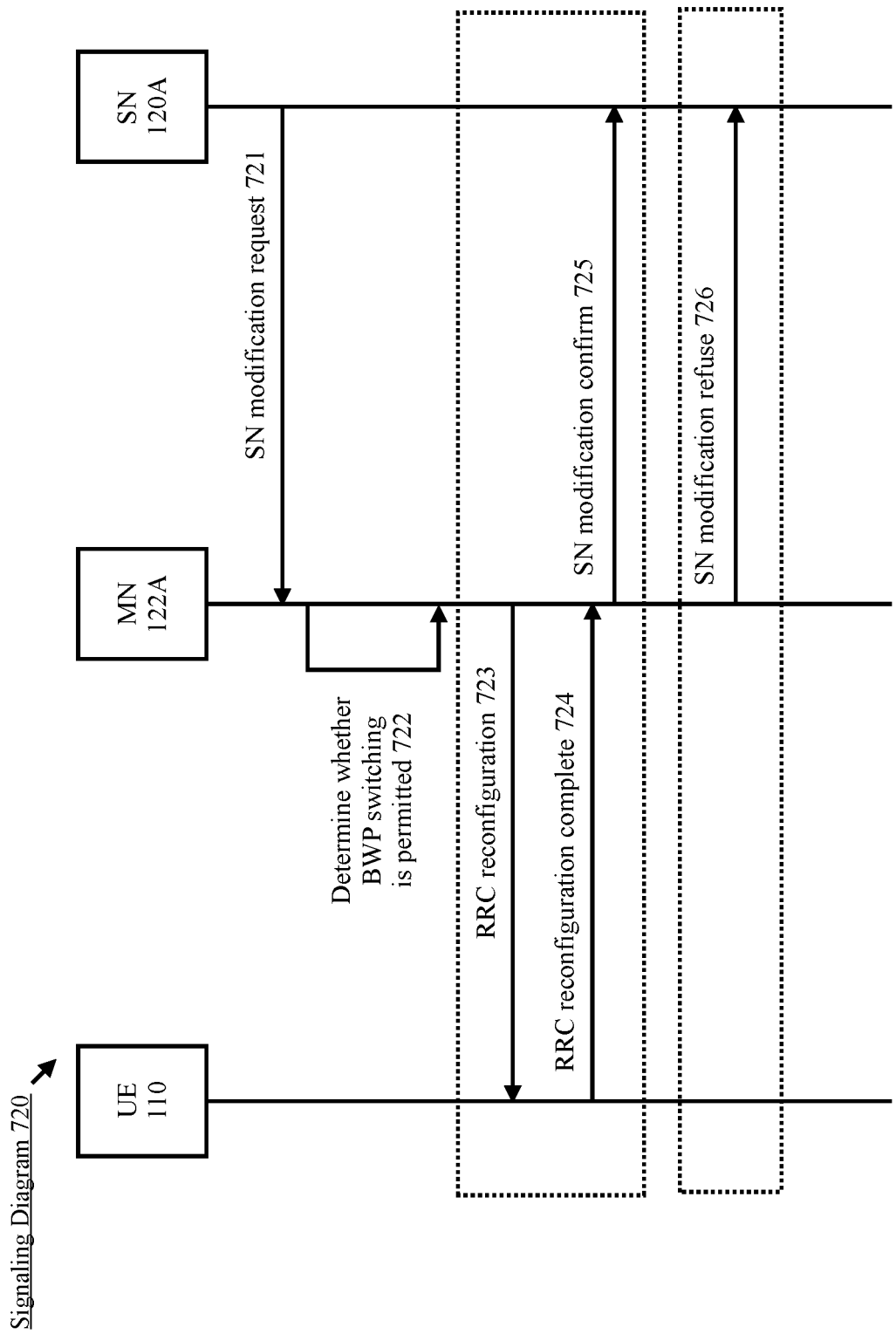
Figure 7C:
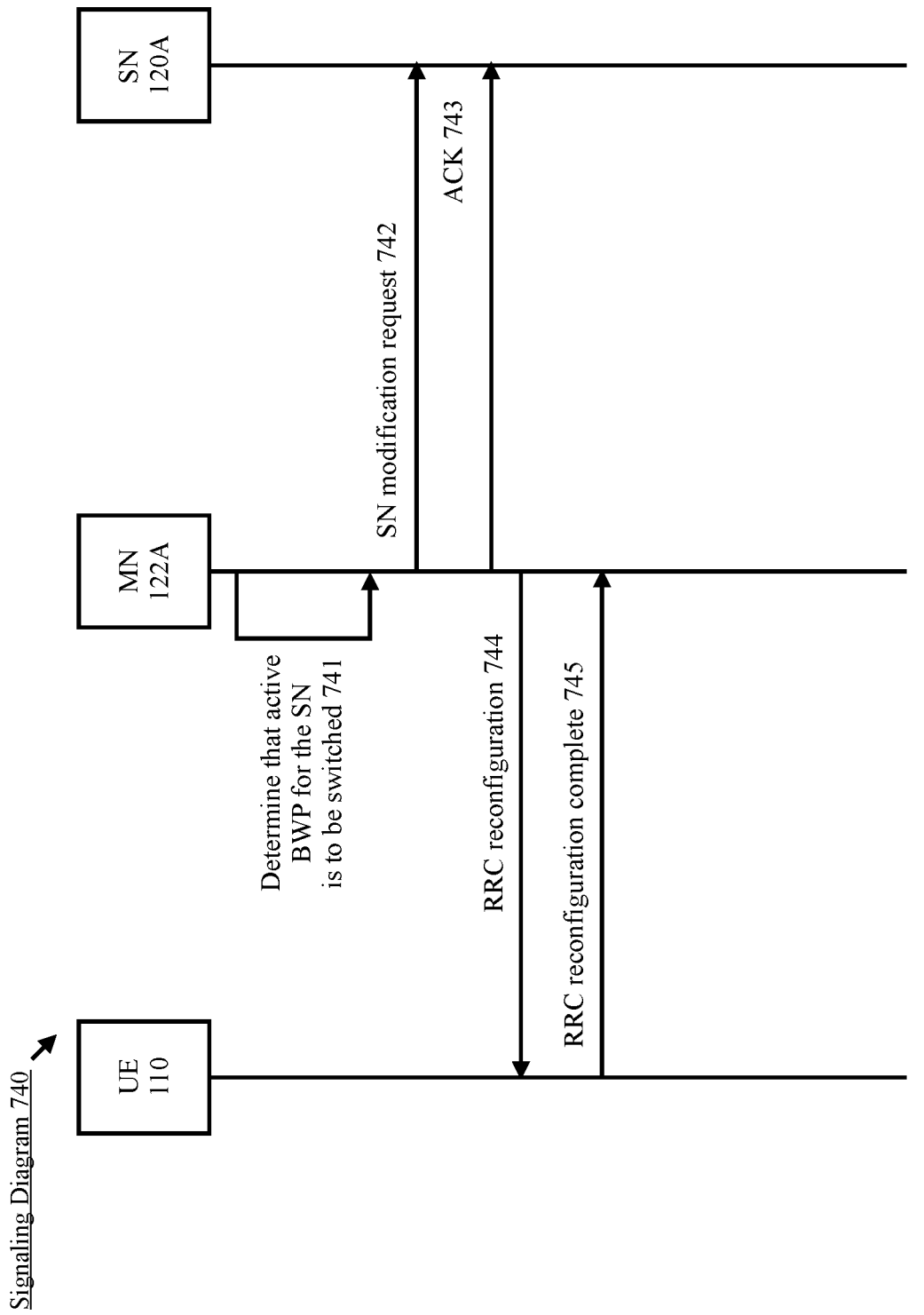

FIGS. 7a-7c show signaling diagrams 700-740 for providing a PSCell dormancy indication via an MCG link according to various exemplary embodiments. The signaling diagrams 700-740 show examples of different types of SN 120A and MN 122A interactions that may occur when providing a PSCell dormancy indication via the MCG link.

In the signaling diagram 700, the SN 120A generates the message that is to be delivered to the UE 110. This message may be transparent to the MN 122A. For example, in 701, the SN 120A may transmit the PSCell dormancy indication to the MN 122A via an RRC transfer message. In 702, the MN 122A may for the PSCell dormancy indication to the UE 110. Thus, the MN 122A may insert the PSCell dormancy indication into the container of the MN message. In 703, the UE 110 may transmit a message to the MN 122A confirming that the UE 110 is aware of the BWP switching. In 704, the MN 122A may then transmit an RRC transfer message to the SN 120A that includes the indication from the UE 110.

In the signaling diagram 720, the MN 122A may control BWP switching for the SN 120A. For example, in 721, the SN 120A may transmit a SN modification request to the MN 122A indicating that the SN 120A wants to switch its active BWP to the dormant BWP 314. In 722, the MN 122A determines whether the BWP switching is permitted. The MN 122A may make this determination on any appropriate basis.

723-725 provide an example of the type of signaling that may occur when the MN 122A permits the SN 120A to activate the dormant BWP 314. In 723, the MN 122A transmits a PSCell dormancy indication to the UE 110 using an RRC reconfiguration message. In 724, the UE 110 may transmit an RRC reconfiguration complete message to the MN 122A. In 725, the MN 122A may transmit a SN modification confirm message indicating that the UE 110 has been informed that the active BWP for the SN 120A is to be switched to the dormant BWP 312.

726 provides an example of the type of signaling that may occur when the MN 122A does not permit the SN 120A to activate the dormant BWP 314. In 726, the MN 122A discards the SN modification request received in 721 and transmits an SN modification refuse message to the SN 120A. This message may indicate to the SN 120A that the non-dormant BWP 312 is to remain configured in the activate state. Thus, in the signaling diagram 720, the SN 120A may make suggestions regarding which BWP is to be utilized by the SN 120A. However, the MN 122A has control over whether or not the BWP switch is performed.

In the signaling diagram 740, the MN 122A may control the dormancy state of the SN 120A. In 741, the MN 122A determines that the active BWP for the SN 120A is to be switched to the dormant BWP 314. In 742, the MN 122A may transmit a SN modification request to the SN 120A. In 743, the SN 120A may transmit an ACK to the MN 122A in response to the request. In 744, the MN 122A may transmit an RRC reconfiguration message to the UE 110 indicating that the active BWP for the SN 120A is to be switched to the dormant BWP 314. In 745, the UE 110 may transmit an RRC reconfiguration complete message to the MN 122A. In 746, the MN 122A may transmit an SN modification confirm message to the SN 120A indicating the RRC reconfiguration procedure is complete and the UE 110 is ready to utilize dormant BWP 314.

As indicated above, the signaling for dormant BWP and non-dormant BWP switching may include the exchange of RRC messages between the UE 110 and the MN 122A. In this type of scenario, the legacy MCG standard radio bearer 1 (SRB1) RRCReconfiguration and RRCReconfiguration-Complete messages may be used to carry SCG information that corresponds to dormant BWP and non-dormant BWP switching for the SN 120A. For example, the SCG portion of these RRC messages may be configured to include a dormancy indication associated with the SN 120A. Similarly, if measurement reporting is supported for the SN 120A when the dormant BWP 314 is configured in the activated state, the SN 120A triggered measurement report may be provided to the MN 122A via MCG SRB1 ULInformation-TransferMRDC message. This information may then be forwarded to the SN 120A and/or used by the MCG for other operations.

Alternatively, the MCG SRB1 RRC message may be configured to carry a new type of message. For example, the SCG dormancy indication may be provided in a "DLInformationTransferMRDC" message or an "ULInformation-TransferMRDC" message portion of an RRC message. If a SCG layer 2 (L2) medium access control (MAC) control element (CE) is transmitted via the MN RRC message, the SCG L2 MAC CE may be provided in a "DLInformation-TransferMRDC" message or an "ULInformationTransfer-MRDC" message portion of the RRC message.

In further embodiments, an MCG uplink/downlink MAC CE may be implemented to carry the container of SCG uplink/downlink MAC CE. This MCG L2 MAC CE may have a subheader variable length. The MCG MAC CE content is the SCG L2 MAC CE where the MAC CE type is indicated via the logical channel ID (LCID). The length may be calculated based on the L parameter in the header of the message.

Figure 8:
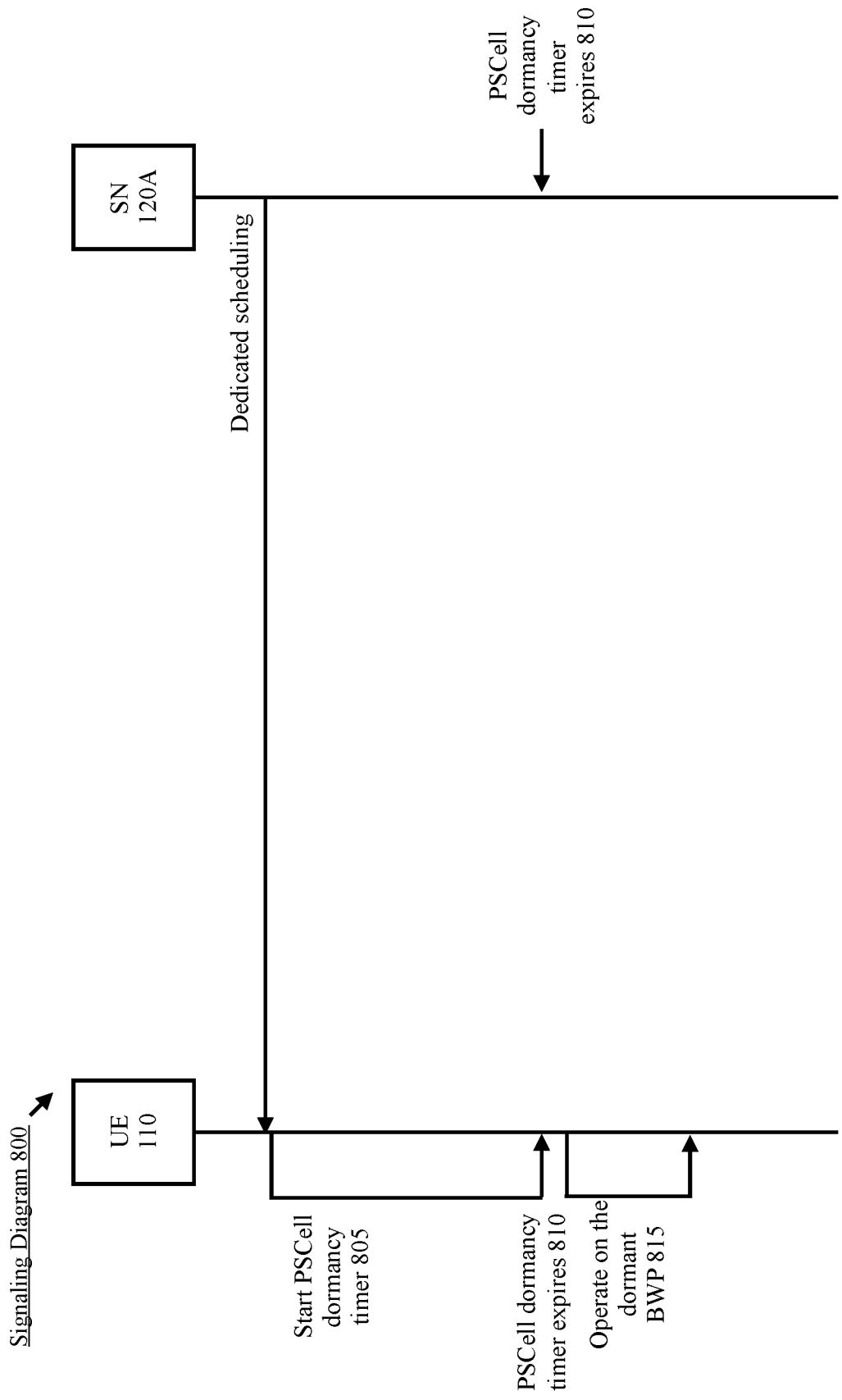
FIG. 8 shows a signaling diagram for timer based non-dormant BWP and dormant BWP switching according to various exemplary embodiments.

FIG. 8 shows a signaling diagram 800 for timer based non-dormant BWP and dormant BWP switching according to various exemplary embodiments. The signaling diagram 800 includes the UE 110 and the SN 120A.

Initially, consider a scenario in which DC is established and the non-dormant BWP 312 is currently configured in the activated state. Further, the UE 110 is configured to switch to the non-dormant BWP 312 when the UE 110 is triggered to switch out from the dormant BWP 314.

As mentioned above, the UE 110 may determine that the active BWP is to be switched based on a process being executed locally at the UE 110. In this example, the network may configure the UE 110 with a PSCell dormancy timer.

In 805, the UE 110 starts (or restarts) the PSCell dormancy timer in response to dedicated scheduling received from the SCG. In some embodiments, the PSCell dormancy timer may also be started (or restarted) in response to performing a transmission to the SCG (not pictured).

Both the network and the UE 110 are aware of the parameters for the PSCell dormancy timer. Thus, in 810, both the UE 110 and the SN 120A are aware that the PSCell inactivity timer has expired. In 815, the UE 110 operations on the dormant BWP 314 because based on the expiration of the timer the UE 110 may assume that the active bandwidth part has been switched from the non-dormant BWP 312 to the dormant BWP 314. Thus, without any explicit signaling from the SN 120A or the MN 122A, the active BWP for the SN 120A may be switched to the dormant BWP 314.

Figure 9:
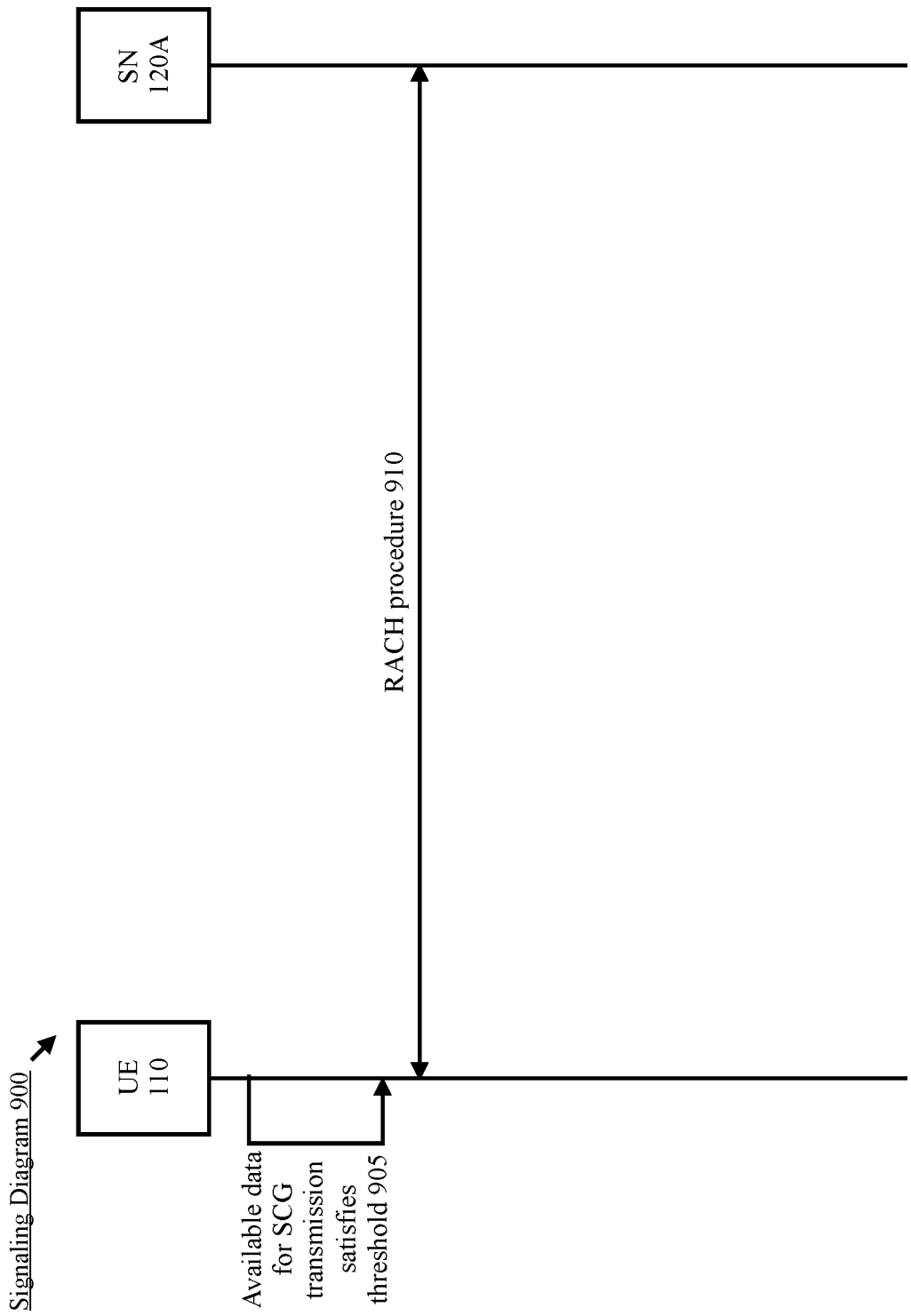
FIG. 9 shows a signaling diagram for threshold based non-dormant BWP and dormant BWP switching according to various exemplary embodiments.

FIG. 9 shows a signaling diagram 900 for threshold based non-dormant BWP and dormant BWP switching according to various exemplary embodiments. The signaling diagram 900 includes the UE 110 and the SN 120A.

Initially, consider a scenario in which DC is established and the dormant BWP 314 is currently configured in the activated state for the SN 120A. Further, the UE 110 is configured to switch to the non-dormant BWP 312 when the UE 110 is triggered to switch out from the dormant BWP 314.

In this example, the network may configure the UE 110 with a threshold value that may be used to trigger BWP switching. In 905, the UE 110 determines that the available data amount for SCG transmission is greater than the threshold value.

In 910, the UE 110 performs a RACH procedure with the SN 120A via the SCG link. Alternatively, the UE 110 may transmit a scheduling request to the SN 120A (not pictured). For example, if the UE 110 identifies or assumes that the UE 110 is out of synchronization in the uplink with the SN 120A, the UE 110 may transmit the RACH. If the UE 110 identifies or assumes that the UE 110 is in synchronization in the uplink with the SN 120A, the UE 110 may transmit the scheduling request.

Figure 10:
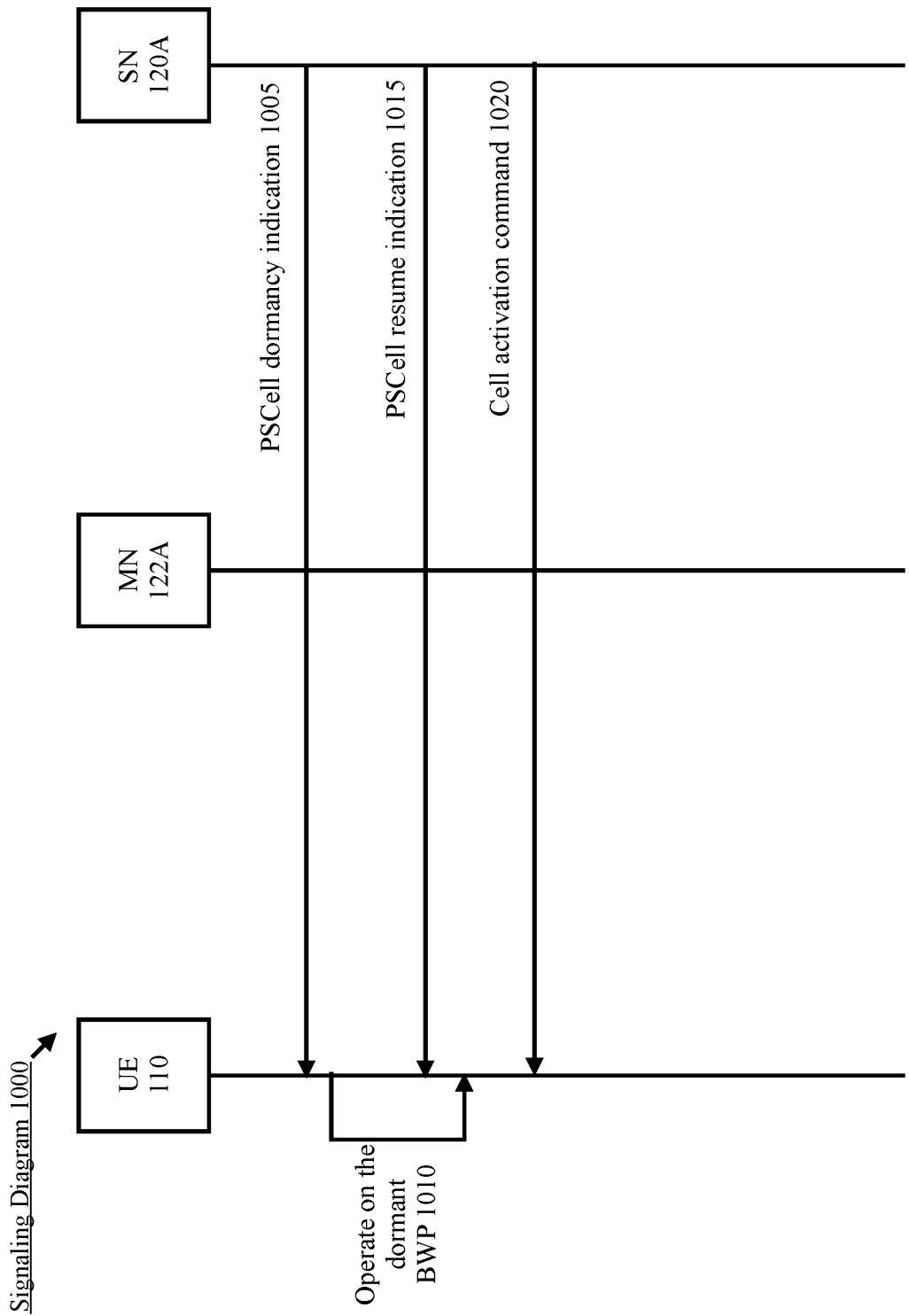
FIG. 10 shows a signaling diagram for SCell activation and deactivation according to various exemplary embodiments.

FIG. 10 shows a signaling diagram 1000 for SCell activation and deactivation according to various exemplary embodiments. The signaling diagram 1000 includes the UE 110, the MN 122A and the SN 120A.

Initially, consider a scenario in which DC is established and the non-dormant BWP 312 is currently configured in the activated state. Further, the UE 110 is configured to switch to the non-dormant BWP 312 when the UE 110 is triggered to switch out from the dormant BWP 314.

In 1005, the UE 110 may receive a PSCell dormancy indicating that the active BWP for the SN 120A is to be switched from the non-dormant BWP 312 to the dormant BWP 314. In this example, the PSCell dormancy indication is shown as being received from the SN 120A. However, as demonstrated above, this type of indication may also be received from the MN 122A or via a process being executed locally at the UE 110.

As mentioned above, when the active BWP for the SN 120A is the dormant BWP 314, all SCells within the SCG may be switched to the deactivated state. Accordingly, in 1010, the UE 110 may operate on the dormant BWP 314 and the SCG may be configured in the SCG dormant state.

In 1015, the UE 110 receives a PSCell resume indication that indicates the active BWP for the SN 120A is to be switched the from the dormant BWP 312 to the non-dormant BWP 314. In this example, the PSCell resume indication is shown as being received from the SN 120A. However, as demonstrated above, this type of indication may also be received from the MN 122A or via a process being executed locally at the UE 110.

At this time, the SCells of the SCG are still configured in the deactivate state. In 1020, the SN 120A may transmit an SCell activation command via the SCG link to the UE 110. This command may indicate to the UE 110 that one or more SCells currently configured in the deactivated state are to transition to the activated state. Thus, in some embodiments, the network may provide explicit signaling for which SCells are to be reactivated. In other embodiments, explicit signaling may not be utilized. Instead, in response to the PSCell resume indication 1015, the UE 110 may assume that initial SCell activated state configured by RRC signaling is to resume.

As indicated above, SCG associated information may be exchanged between the UE 110 and the SN 120A via the MN 122A when the dormant BWP 314 is configured in the activated state. In some embodiments, the SCG associated information may be transmitted by the UE 110 in the container of the ULInformationTransferMRDC to the MN 122A and then forwarded to the SN 120A by the MN 122A. Similarly, SCG associated information may be forwarded to the UE 110 by the MN 122A in the container of DLInformationTransferMRDC. Alternatively, the SCG associated information may be transmitted in a layer 2 (L2) cross cell group MAC CE.

The SCG associated information may include, but is not limited to, CSI reporting, SCG specific RRC messages transmitted via SRB3 or SRB1 (e.g., measurement reports, UE assistance information, RRCreconfiguration, RRCreconfiguration complete, etc.), uplink MAC CEs (e.g., buffer status report (BSR) MAC CE, BFR MAC CE, listen-before-talk MAC CE, etc.), a tracking area (TA) command, a discontinuous reception (DRX) command, etc.

Figure 11:
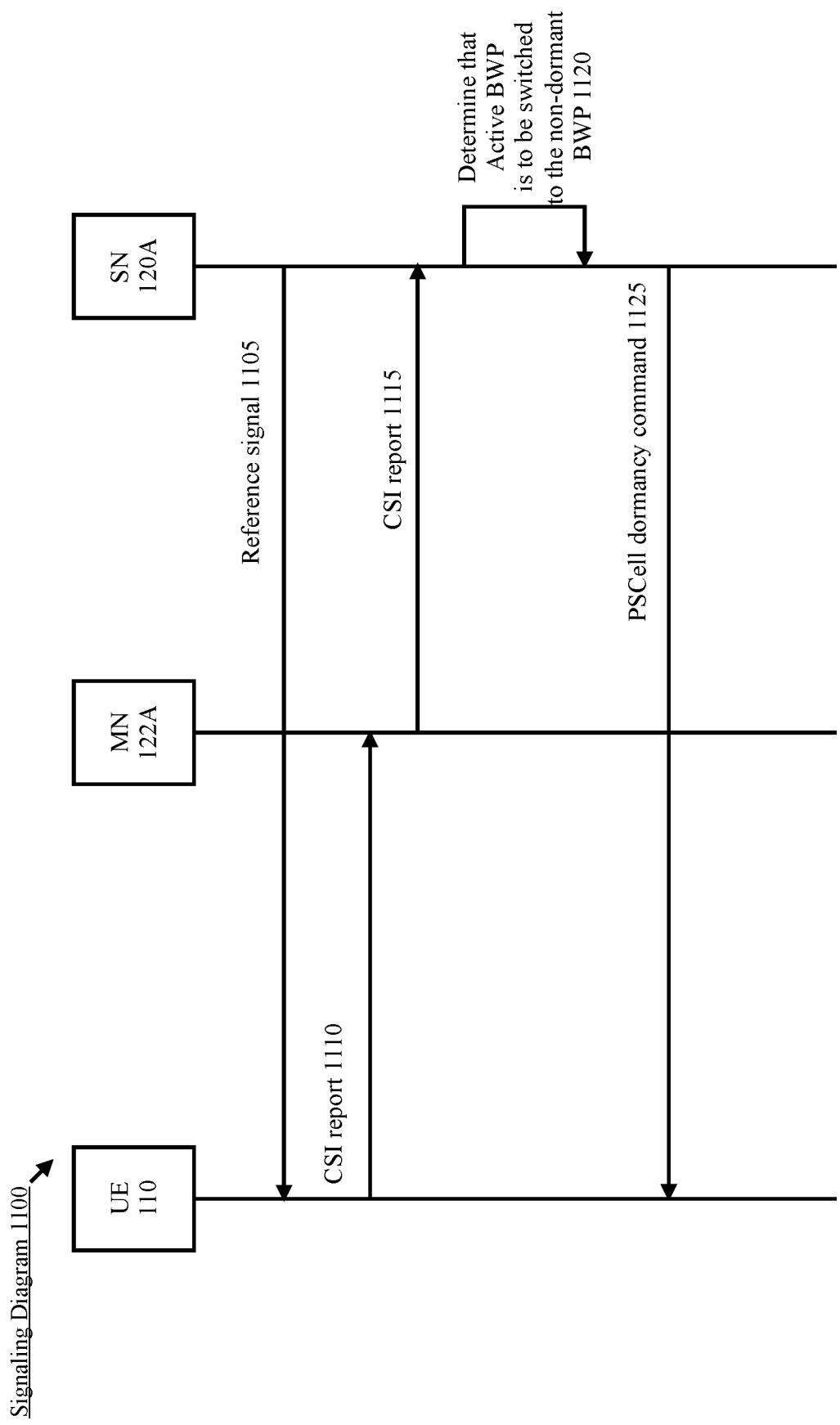
FIG. 11 shows a signaling diagram for exchanging SCG associated information via the master node (MN) according to various exemplary embodiments.

FIG. 11 shows a signaling diagram 1100 for exchanging SCG associated information via the MN 122A according to various exemplary embodiments. The signaling diagram 1100 includes the UE 110, the MN 122A and the SN 120A.

Initially, consider a scenario in which DC is established and the dormant BWP 314 is currently configured in the activated state for the SN 120A. Further, the UE 110 is configured to switch to the non-dormant BWP 312 when the UE 110 is triggered to switch out from the dormant BWP 314.

In 1105, the UE 110 receives a reference signal from the SN 120A. For example, the UE 110 may monitor the common search space when the dormant BWP 314 is in the activated state. The UE 110 may collect CSI measurement data based on measuring one or more reference signals.

Next, the UE 110 may transmit a CSI report to the SN 120A via the MN 122A. For example, the CSI measurement data may satisfy a predetermined condition and trigger the transmission of the CSI measurement report to the SN 120A. Thus, in 1110 the UE 110 may transmit the CSI measurement data to the MN 122A and in 1115 the MN 122A may forward the CSI measurement data to the SN 120A.

The UE 110 may transmit an indication of the CSI measurement data to the MN 122A in the ULinformationTransferMRDC container. The MN 122A may then forward the CSI measurement data to the SN 120A. Alternatively, the UE 110 may transmit an indication of the CSI measurement data to the MN 122A in a L2 MAC CE. The MN 122A may then forward the CSI measurement data to the SN 120A.

In 1120, the SN 120A may determine that the active BWP is to be switched from the dormant BWP 314 to the non-dormant BWP 312. This determination may be based on factors such as, but not limited to, an amount of data that is to be received and/or transmitted by the UE 110 and the CSI measurement data. Although not show in the signaling diagram 1100, a scenario may occur where the CSI report indicates that the SN 120A is not capable of providing an adequate network connection and thus, the network may determine that the SN 120A is to be released and/or a different one or more SNs are configured.

In 1125, the SN 120A may transmit a PSCell dormancy command to switch out of the dormant BWP 314 to the non-dormant BWP 312. As mentioned above, this type of message may be provided to the UE 110 in any of a variety of different ways. Thus, the message in 1125 being shown as being provided directly to the UE 110 via the SCG link is merely provided for illustrative purposes.

Figure 12:
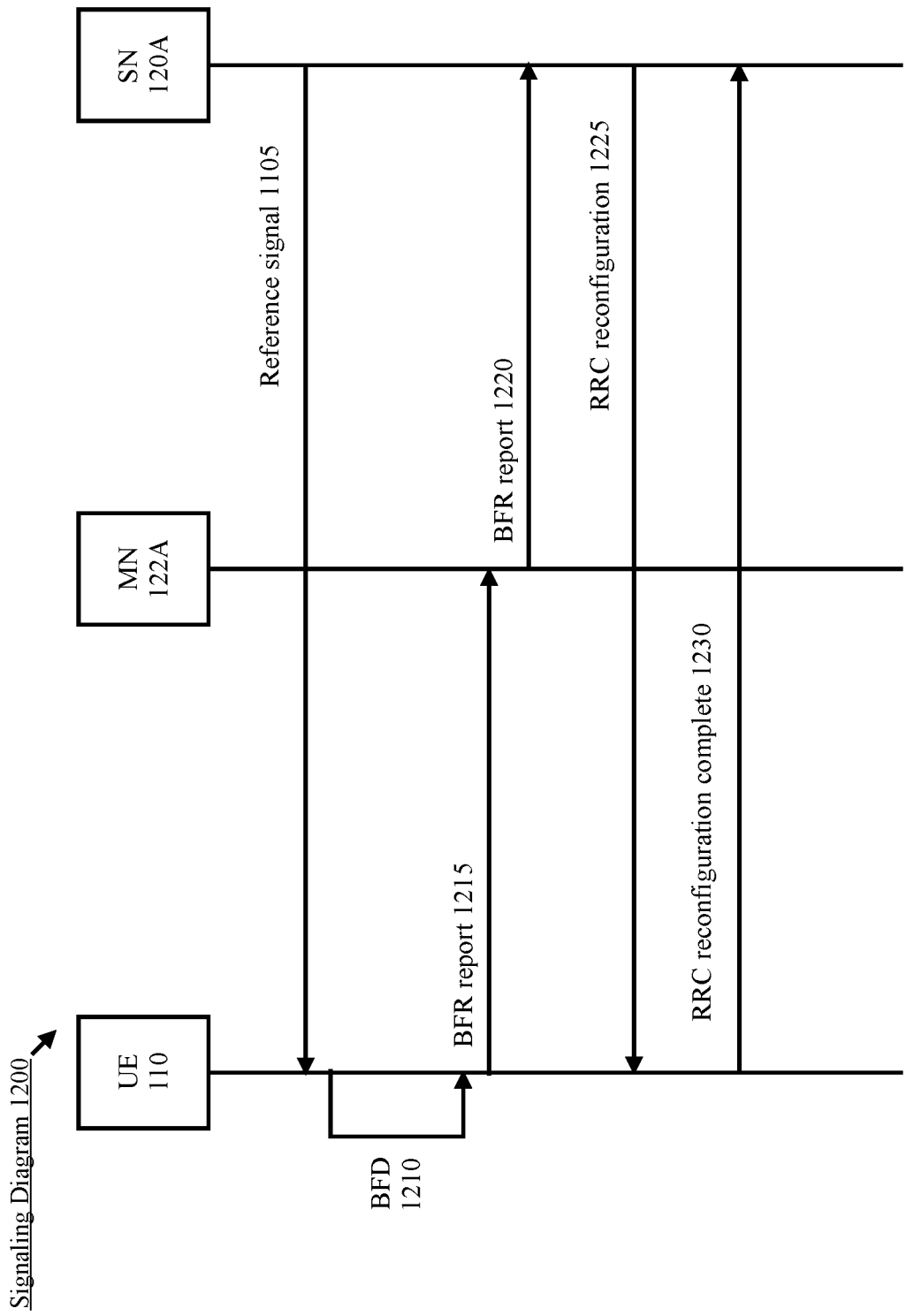
FIG. 12 shows a signaling diagram for exchanging SCG associated information via the MN according to various exemplary embodiments.

FIG. 12 shows a signaling diagram 1200 for exchanging SCG associated information via the MN 122A according to various exemplary embodiments. The signaling diagram 1200 includes the UE 110, the MN 122A and the SN 120A.

Initially, consider a scenario in which DC is established and the dormant BWP 314 is currently configured in the activated state for the SN 120A. Further, the UE 110 is configured to switch to the non-dormant BWP 312 when the UE 110 is triggered to switch out from the dormant BWP 314.

In 1205, the UE 110 receives a reference signal from the SN 120A. For example, the UE 110 may monitor the common search space when the dormant BWP 314 is in the activated state. In 1210, the UE 110 may perform BFD based on measuring one or more reference signals. In response to the BFD procedure, the UE 110 may be triggered to send a BFR report to the SN 120A and stop the BFD procedure on the SN 120A.

In 1215, the UE 110 may transmit the BFR report to the MN 122A. In addition, the UE 110 may also terminate the BFD procedure at the UE 110. In 1220 the MN 122A may forward the BFR report to the SN 120A. The UE 110 may transmit an indication of the BFR report to the MN 122A in the ULinformationTransferMRDC container. The MN 122A may then forward the indication of the BFR report to the SN 120A. Alternatively, the UE 110 may transmit the indication of the BFR report data to the MN 122A in the L2 MAC CE. The MN 122A may then forward the indication of the BFR report to the SN 120A.

In response, the SN 120A may trigger RRCReconfiguration to reconfigure the beam. Thus, in 1225, SCG specific RRC reconfiguration information may be sent to the UE 110 in the SRB3 or SRB1 container. As mentioned above, this type of message may be provided to the UE 110 in any of a variety of different ways. Thus, the message in 1230 shown as being provided directly to the UE 110 via the SCG link is merely provided for illustrative purposes.

In 1230, an RRCReconfiguration complete message may be transmitted by the UE 110 to the SN 120A in the SRB3 or SRB1 container.

In other embodiments, instead of transmitting the BFR report to the SN 120A, the UE 110 may trigger a RACH procedure on the SN 120A to switch the active BWP from the dormant BWP 314 to the non-dormant BWP 312 based on the BFD procedure.

Figure 13:
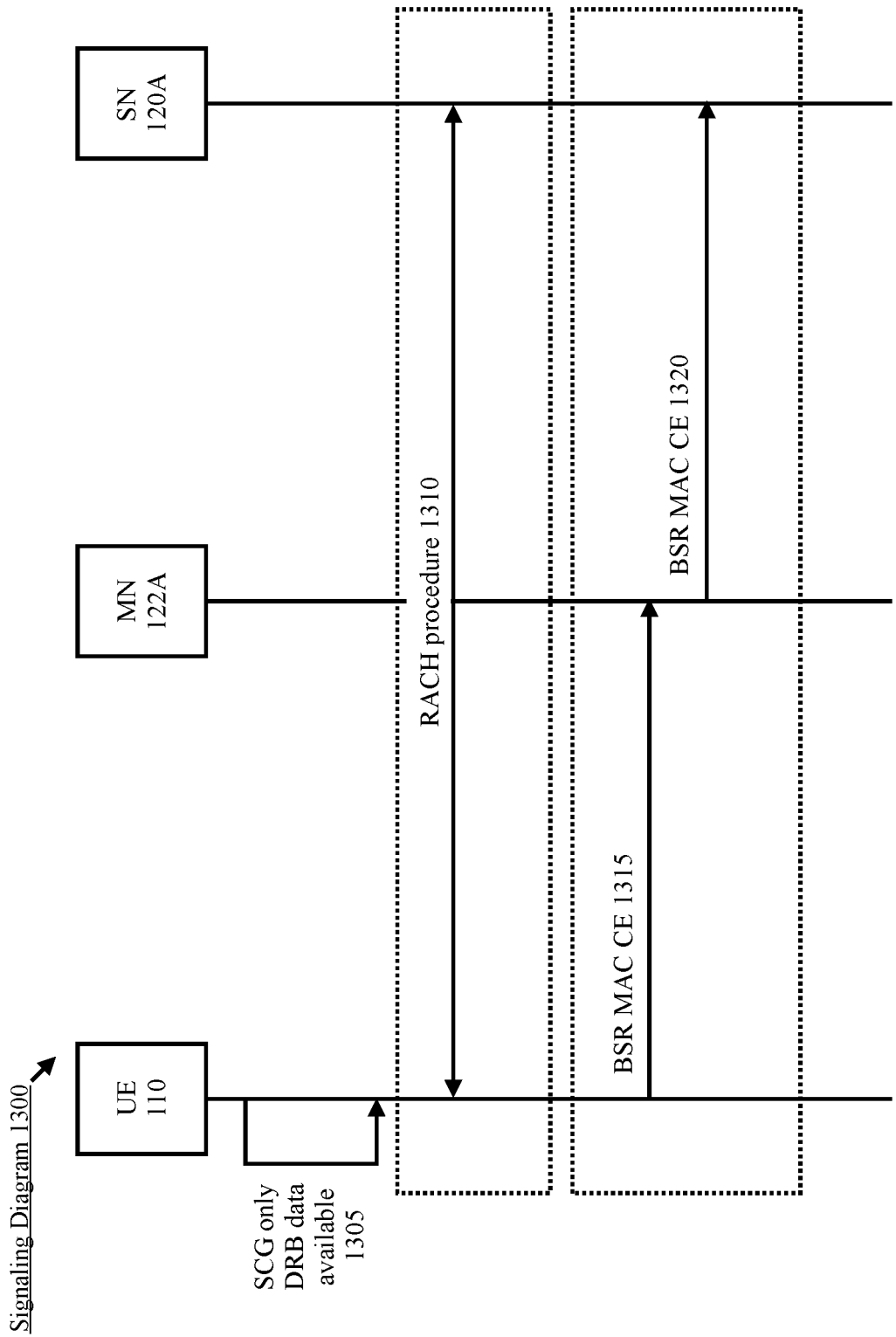
FIG. 13 shows a signaling diagram for exchanging SCG associated information via the MN according to various exemplary embodiments.

FIG. 13 shows a signaling diagram 1300 for exchanging SCG associated information via the MN 122A according to various exemplary embodiments. The signaling diagram 1300 includes the UE 110, the MN 122A and the SN 120A.

Initially, consider a scenario in which DC is established and the dormant BWP 314 is currently configured in the activated state for the SN 120A. Further, the UE 110 is configured to switch to the non-dormant BWP 312 when the UE 110 is triggered to switch out from the dormant BWP 314.

In 1305, the UE 110 may determine that data from the SCG only dedicated radio bearer (DRB) is to be received by the UE 110. This determination may be based on a schedule, a previously received indication or any other appropriate type of indication.

In 1310, the UE 110 may initiate a RACH procedure (or send a scheduling request) to trigger the switch of the active BWP from the dormant BWP 314 to the non-dormant BWP 312.

Alternatively, in 1315, the UE 110 may transmit a SCG buffer status report (BSR) MAC CE to the MN 122A. In 1320, the MN 122A may forward the BSR MAC CE to the SN 120A. For example, the UE 110 may transmit the BSR MAC CE to the MN 122A in the ULinformationTransferMRDC container. The MN 122A may then forward the BSR MAC CE to the SN 120A. Alternatively, the UE 110 may transmit the BSR MAC CE to the MN 122A as a L2 MAC CE (e.g., cross cell group MAC CE). The MN 122A may then forward the BSR MAC CE to the SN 120A.

In other embodiments, there may be different procedures for different data types. For example, if the available data is from the SCG only DRB, the UE 110 may initiate BWP switching via RACH procedure or a scheduling request. If the available data is only from the split DRB, the UE 110 may transmit the SCG MAC CE to the SN 120A via the MN 122A or the UE 110 may cancel the BSR.

In another example, if the available data is only for the split DRB, the data amount and the data delivery will not inform to the suspected SCG link and the UE 110 packet data convergence protocol (PDCP) can only deliver the data amount information to the MCG link and only trigger the MCG BSR MAC CE. With this enhancement, the UE 110 does not need to trigger the SCG BSR reporting to the SN 120A and will not trigger the data transmission via the SCG link to the SN 120A and the SCG may remain in the dormant state. In some embodiments, this exemplary technique may be selectively implemented based on a comparison of the available data to a threshold value.

Figure 14:
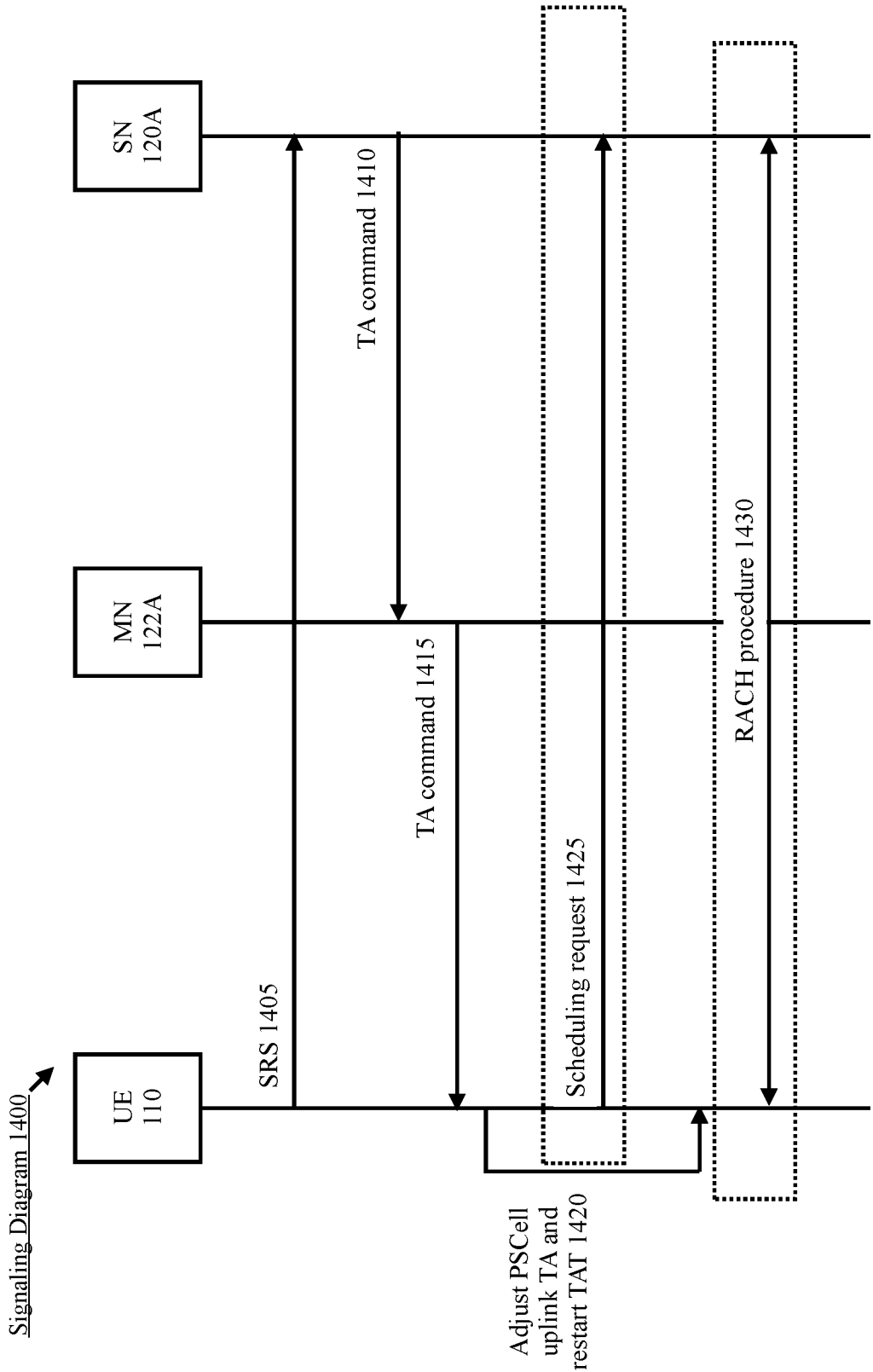
FIG. 14 shows a signaling diagram for exchanging SCG associated information via the MN according to various exemplary embodiments.

FIG. 14 shows a signaling diagram 1400 for exchanging SCG associated information via the MN 122A according to various exemplary embodiments. The signaling diagram 1400 includes the UE 110, the MN 122A and the SN 120A.

Initially, consider a scenario in which DC is established and the dormant BWP 314 is currently configured in the activated state for the SN 120A. Further, the UE 110 is configured to switch to the non-dormant BWP 312 when the UE 110 is triggered to switch out from the dormant BWP 314.

In 1405, the UE 110 may transmit an SRS to the SN 120A. In 1410, the SN 120A may transmit a tracking area (TA) command to the MN 122A. IN 1415, the MN 122A may forward the TA command the UE 110.

In 1420, the UE 110 may adjust the PSCell uplink TA and restart the time alignment adjustment timer (TAT). if the TAT is still running, the UE 110 may assume the UE 110 is still synchronized in the uplink. Thus, in 1425, the UE 110 may transmit a scheduling request initiate the switch of the active BWP from the dormant BWP 314 to the non-dormant BWP 312 and facilitate the exchange of data between the UE 110 and the SN 120A. Alternatively, if the TAT expires, in 1430, a RACH procedure may be performed to synchronize with the SN 120A and switch the active BWP from the dormant BWP 314 to the non-dormant BWP 314. Alternatively, FIG. 15 shows a signaling diagram 1500 for exchanging SCG associated information via the MN 122A according to various exemplary embodiments. The signaling diagram 1500 includes the UE 110, the MN 122A and the SN 120A.

Initially, consider a scenario in which DC is established and the dormant BWP 314 is currently configured in the activated state for the SN 120A. Further, the UE 110 is configured to switch to the non-dormant BWP 312 when the UE 110 is triggered to switch out from the dormant BWP 314.

In 1505, the UE 110 may receive a reference signal from the SN 120A. The UE 110 may generate measurement data based on one or more reference signal. In this example, when the measurement data satisfies a threshold value a measurement report may be transmitted to the SN 120A via the MN 122A.

In 1510, the UE 110 may transmit an indication of the measurement report in an ULInformationTransferMRDC container to the MN 122A. In 1515, the MN 122A may forward an indication of the measurement report to the SN 120A. In some embodiments, instead of or in addition to the measurement report, the UE 110 may also transmit a request for the network to perform dormant BWP to non-dormant BWP switching on the SN 120A. Thus, in response to the SN 120A radio quality exceeding a threshold the UE 110 may trigger dormant BWP to non-dormant BWP switching via the request.

In other embodiments, instead of a request, the UE 110 may initiate the dormant BWP to non-dormant BWP switching. For example, the UE 110 may initiate a RACH procedure to trigger the BWP switching. In this type of scenario, the UE 110 may also send data, a BSR and/or a measurement report associated with the SN 120A to the network.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:
a processor configured to perform operations comprising:
identifying a dormant bandwidth part (BWP) and a non-dormant BWP of a carrier corresponding to a primary secondary cell (PSCell) of a secondary cell group (SCG) for dual connectivity (DC);
receiving an indication that an active BWP is to be switched from the non-dormant BWP to the dormant BWP;
when the active BWP is the dormant BWP, performing beam failure detection on the PSCell;
when the active BWP is the dormant BWP, collecting channel state information (CSI) measurement data corresponding to the PSCell;
when the active BWP is the dormant BWP, generating a CSI report for transmission to the PSCell via a primary cell (PCell);
when the active BWP is the dormant BWP, generating a SCG buffer status for transmission to the PCell; and
performing an action corresponding to the dormant BWP; and
a transceiver communicatively connected to the processor.

2. The UE of claim 1, wherein the indication is included in a layer 1 (L1) command received from the PSCell.

3. The UE of claim 1, wherein performing the action includes receiving a further indication that the active BWP is to be switched from the dormant BWP to the non-dormant BWP and wherein the further indication is included in a layer 1 (L1) command received from the PSCell.

4. The UE of claim 1, wherein the indication is generated by the PSCell and received from the PSCell via a master node (MN).

5. The UE of claim 4, wherein the operations further comprise:
transmitting an acknowledgement (ACK) to the PSCell via the MN in response to the indication.

6. The UE of claim 1, wherein performing the action includes receiving a further indication that the active BWP is to be switched from the dormant BWP to the non-dormant BWP and wherein the further indication is received from the PSCell via a master node.

7. The UE of claim 1, wherein the indication is received from a master node (MN) that determines that the active BWP of the PSCell is to be switched from the non-dormant BWP to the dormant BWP.

8. The UE of claim 1, wherein the indication is based on an PSCell dormancy timer running on the UE.

9. The UE of claim 1, wherein the operations further comprise:
determining that the active BWP is to be switched from the dormant BWP to the non-dormant BWP based on monitoring a threshold locally at the UE; and
transmitting a scheduling request or a random access channel (RACH) signal to the PSCell in response to determining that the active BWP is to be switched from the dormant BWP to the non-dormant BWP.

10. The UE of claim 1, wherein the operations further comprise:
initiating a random access channel (RACH) procedure with the PSCell based on the measurement data to initiate a switch of the active BWP from the dormant BWP to the non-dormant BWP.

11. An apparatus comprising processing circuitry configured to perform operations comprising:
identifying a dormant bandwidth part (BWP) and a non-dormant BWP of a carrier corresponding to a primary secondary cell (PSCell) of a secondary cell group (SCG) for dual connectivity (DC);
receiving an indication that an active BWP is to be switched from the non-dormant BWP to the dormant BWP;
when the active BWP is the dormant BWP, performing beam failure detection on the PSCell;
when the active BWP is the dormant BWP, collecting channel state information (CSI) measurement data corresponding to the PSCell;
when the active BWP is the dormant BWP, generating a CSI report for transmission to the PSCell via a primary cell (PCell);

when the active BWP is the dormant BWP, generating a SCG buffer status for transmission to the PCell; and performing an action corresponding to the dormant BWP.

12. The apparatus of claim 11, wherein performing the action includes receiving a further indication that the active BWP is to be switched from the dormant BWP to the non-dormant BWP and wherein the further indication is included in a layer 1 (L1) command received from the PSCell.

13. The apparatus of claim 11, wherein performing the action includes receiving a further indication that the active BWP is to be switched from the dormant BWP to the non-dormant BWP and wherein the further indication is received from the PSCell via a master node.

14. The apparatus of claim 11, wherein the indication is received from a master node (MN) that determines that the active BWP of the PSCell is to be switched from the non-dormant BWP to the dormant BWP.

15. A method, comprising:
at a user equipment (UE):
identifying a dormant bandwidth part (BWP) and a non-dormant BWP of a carrier corresponding to a primary secondary cell (PSCell) of a secondary cell group (SCG) for dual connectivity (DC);

when the active BWP is the dormant BWP, performing beam failure detection on the PSCell;

when the active BWP is the dormant BWP, collecting channel state information (CSI) measurement data corresponding to the PSCell;

when the active BWP is the dormant BWP, transmitting a CSI report to the PSCell via a primary cell (PCell);

when the active BWP is the dormant BWP, transmitting a SCG buffer status to the PCell; and performing an action corresponding to the dormant BWP.

16. The method of claim 15, wherein the indication is generated by the PSCell and received from the PSCell via a master node (MN).

17. The method of claim 15, wherein performing the action includes receiving a further indication that the active BWP is to be switched from the dormant BWP to the non-dormant BWP and wherein the further indication is received from the PSCell via a master node.

18. The method of claim 15, wherein the indication is included in a layer 1 (L1) command received from the PSCell.

* * * * *